United States Patent
Peterson et al.

(10) Patent No.: US 9,449,415 B2
(45) Date of Patent: Sep. 20, 2016

(54) METHOD AND SYSTEM FOR PRESENTING EDUCATIONAL MATERIAL

(71) Applicant: Mind Research Institute, Irvine, CA (US)

(72) Inventors: Matthew R. Peterson, Irvine, CA (US); Nigel Nisbet, Irvine, CA (US); Theodore Alteneder, Irvine, CA (US)

(73) Assignee: MIND Research Institute, Irvine, CA (US)

( * ) Notice: Subject to any disclaimer, the term of this patent is extended or adjusted under 35 U.S.C. 154(b) by 203 days.

(21) Appl. No.: 13/831,104

(22) Filed: Mar. 14, 2013

(65) Prior Publication Data

US 2014/0267305 A1 Sep. 18, 2014

(51) Int. Cl.

| | |
|---|---|
| G06T 13/00 | (2011.01) |
| G06Q 40/00 | (2012.01) |
| G06K 9/00 | (2006.01) |
| G06F 3/041 | (2006.01) |
| G06T 1/00 | (2006.01) |
| G06F 3/033 | (2013.01) |
| G09B 5/06 | (2006.01) |
| G09B 19/00 | (2006.01) |
| G09B 19/02 | (2006.01) |

(52) U.S. Cl.
CPC ............... *G06T 13/00* (2013.01); *G09B 5/065* (2013.01); *G09B 19/00* (2013.01); *G06F 3/033* (2013.01); *G06F 3/041* (2013.01); *G06K 9/00* (2013.01); *G06Q 40/00* (2013.01); *G09B 19/02* (2013.01)

(58) Field of Classification Search
None
See application file for complete search history.

(56) References Cited

U.S. PATENT DOCUMENTS

| | | | |
|---|---|---|---|
| 6,747,650 B2 | 6/2004 | Turner et al. | |
| 8,243,066 B2 | 8/2012 | Garfinkle | |
| 2004/0175684 A1* | 9/2004 | Kaasa | G09B 23/28 434/262 |
| 2010/0134499 A1* | 6/2010 | Wang et al. | 345/473 |
| 2010/0149109 A1* | 6/2010 | Elias | 345/173 |
| 2010/0190143 A1* | 7/2010 | Gal et al. | 434/322 |
| 2013/0050224 A1* | 2/2013 | Gehani et al. | 345/473 |
| 2013/0127874 A1* | 5/2013 | Peterson | 345/473 |
| 2013/0226444 A1* | 8/2013 | Johansson et al. | 701/300 |
| 2014/0053071 A1* | 2/2014 | Penner | 715/732 |
| 2014/0104279 A1* | 4/2014 | Albrecht | 345/440 |

OTHER PUBLICATIONS

Mark Barnes and Ellen Levy Finch, "COLLADA—Digital Asset Schema Release 1.5.0 Specification", Apr. 2008, Sony computer entertainment inc.*
Prezi, www.prezi.com.
Xtranormal, www.xtranormal.com.
Softmaker, www.softmaker.com.
Opus Creator, http://www.digitalworkshop.com/products/creator.shtml.

* cited by examiner

*Primary Examiner* — Ming Hon
*Assistant Examiner* — Yu-Jang Tswei
(74) *Attorney, Agent, or Firm* — Klein, O'Neill & Singh, LLP

(57) ABSTRACT

Method and system for presenting a lesson plan having a plurality of keyframes is provided. The method includes initializing a fixed variable for a first keyframe; detecting an input from a user at an interactive display device; correlating the input with a gesture from a gesture set and one or more of database domains from among a plurality of database domains; displaying an image at the interactive display device when all mutable variables for the first keyframe content are determined based on the input; manipulating the image using a gesture associated with the displayed image and any associated database domains; and transitioning to a next keyframe using animation.

14 Claims, 32 Drawing Sheets

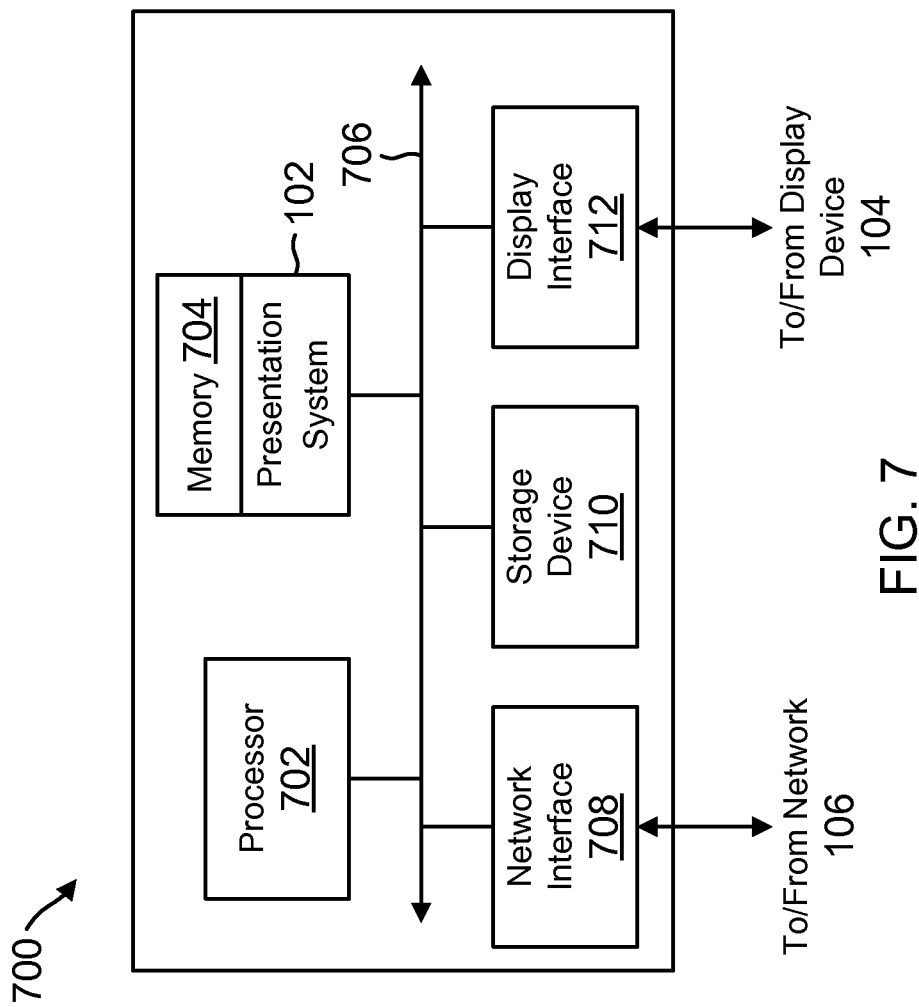

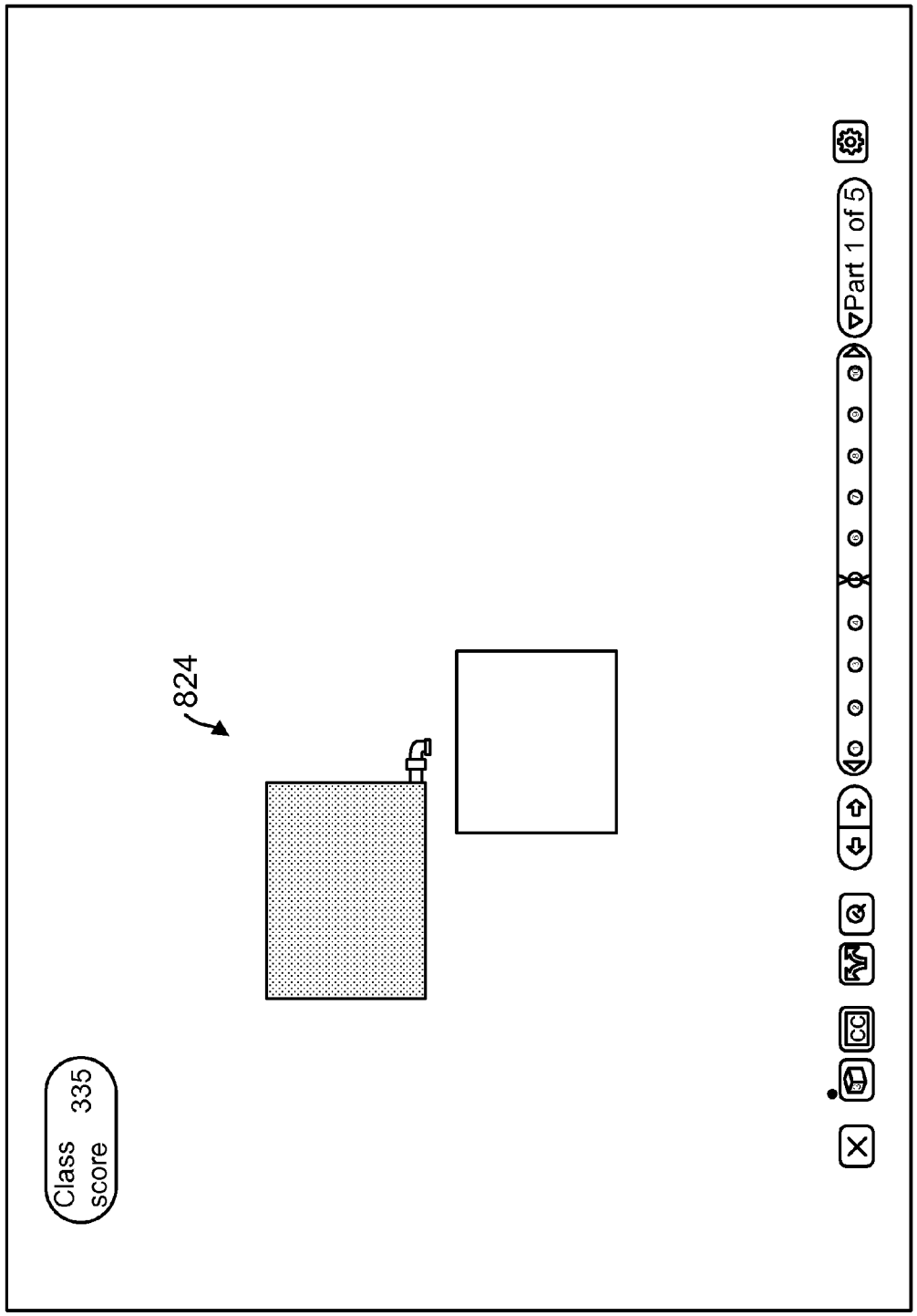

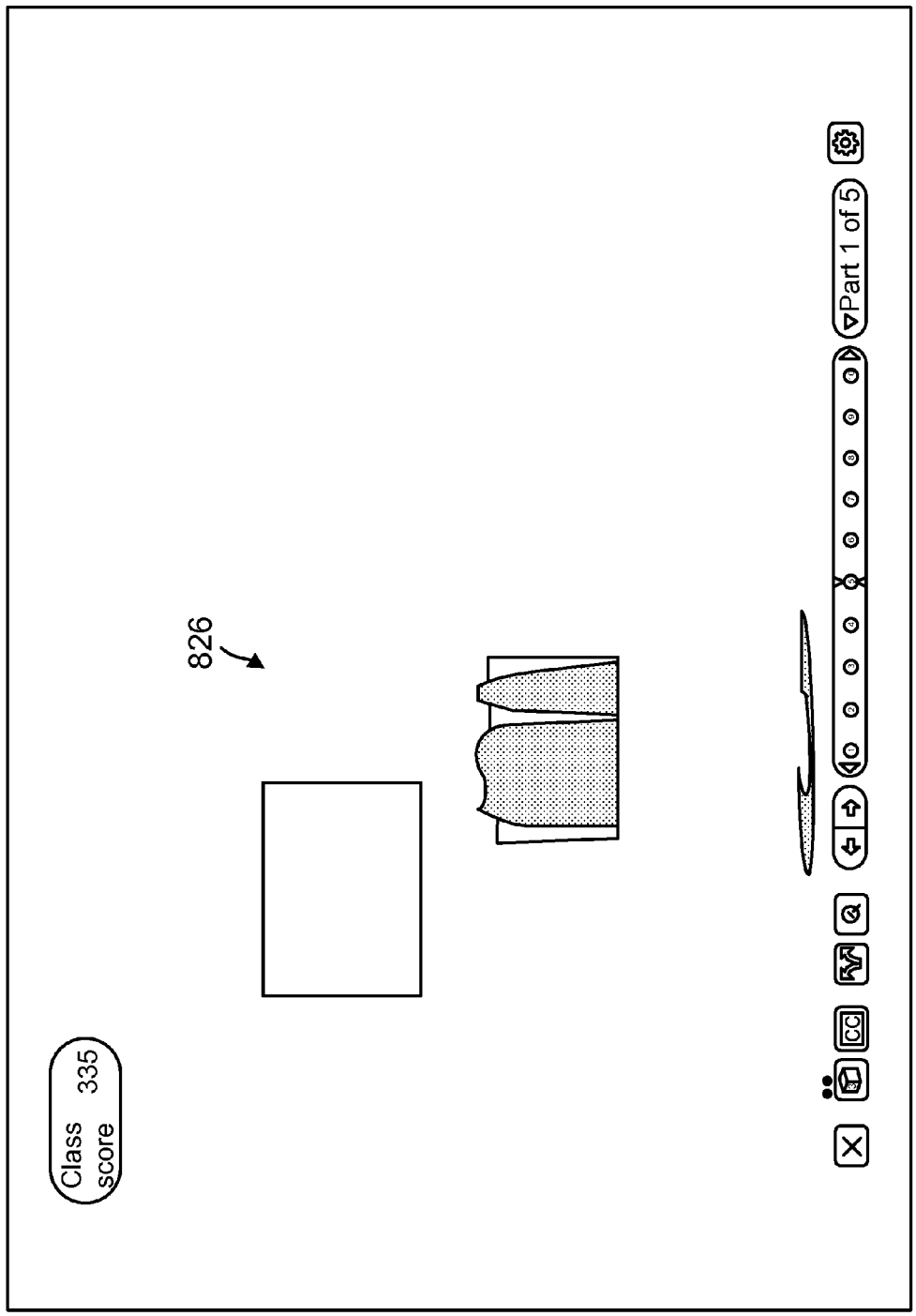

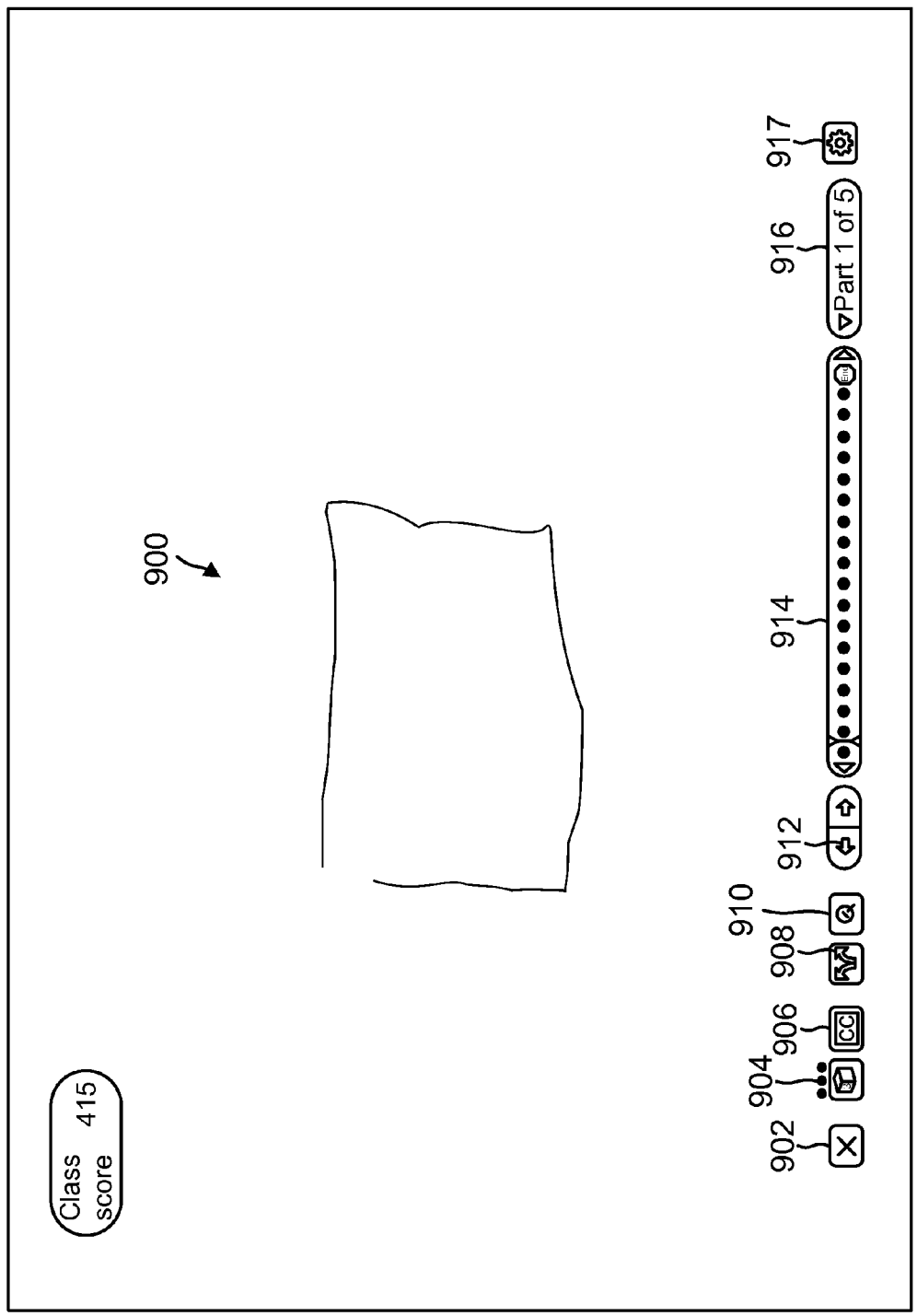

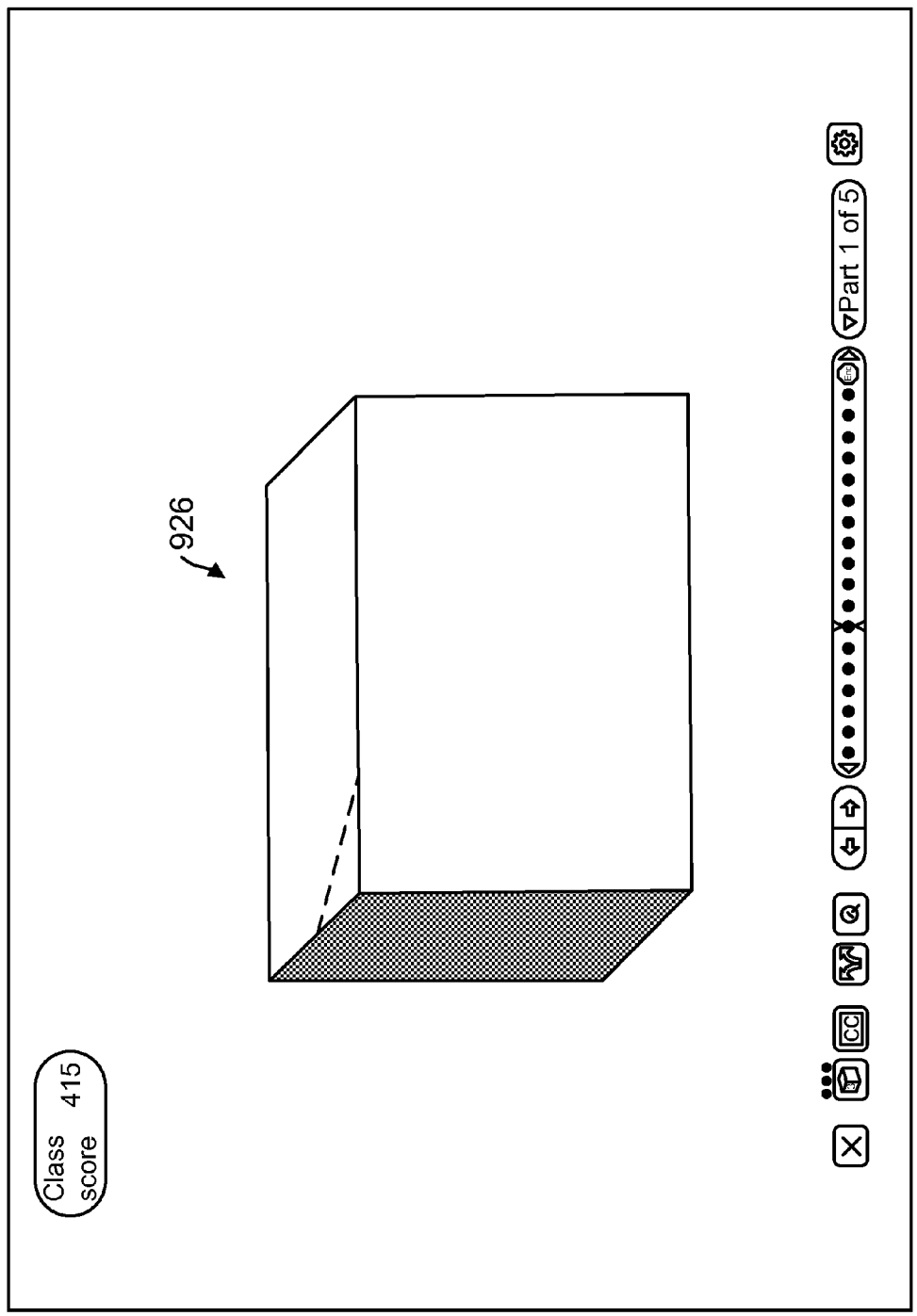

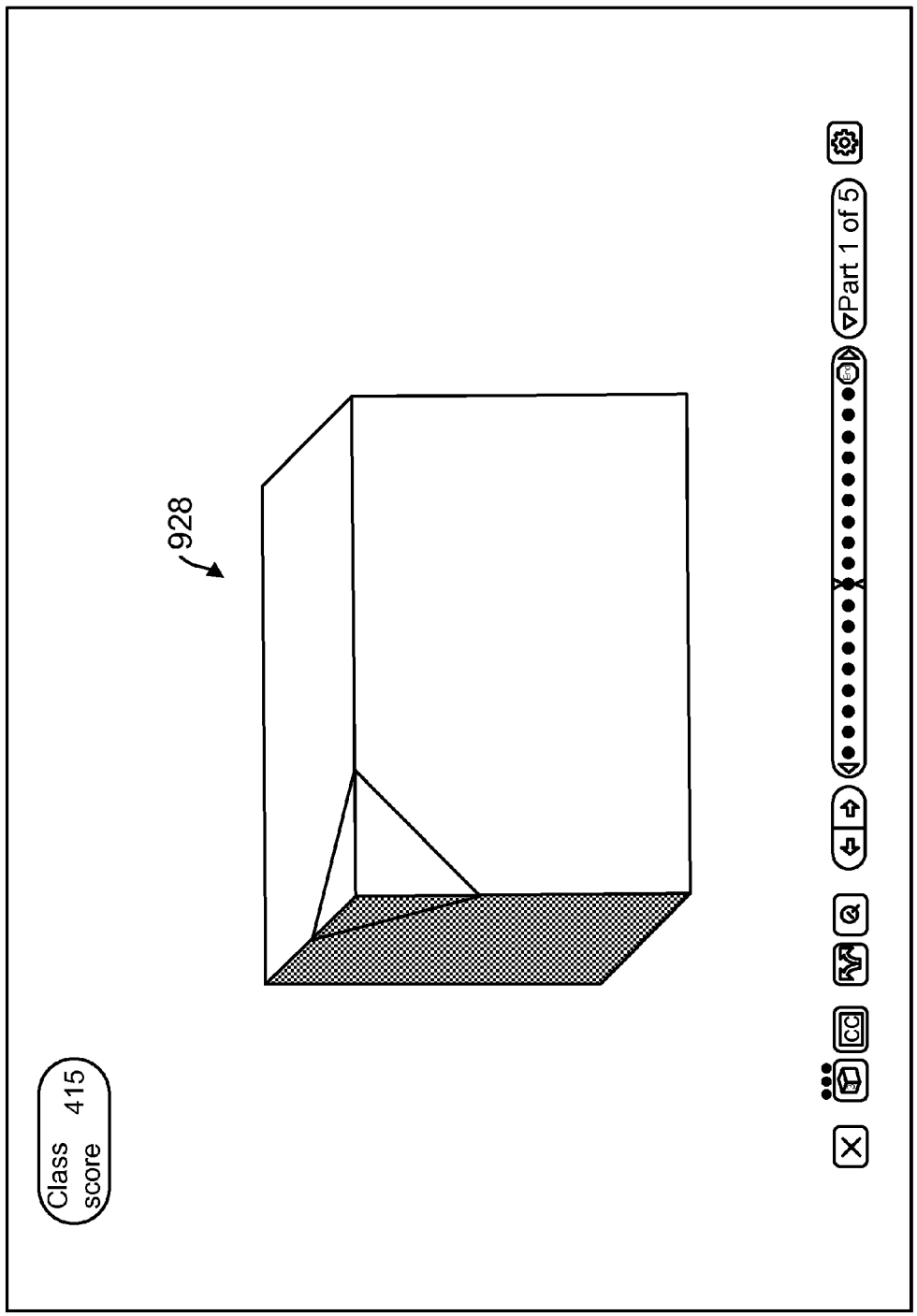

METHOD AND SYSTEM FOR PRESENTING EDUCATIONAL MATERIAL

TECHNICAL FIELD

The present disclosure relates to machine implemented methods and systems for presenting educational materials and lesson plans.

RELATED ART

Educational materials, for example, to teach mathematical concepts, are static, have limited flexibility, and fail to meet the needs of all learners. This prevents students from gaining understanding and mastery of mathematical concepts in a classroom setting. Continuous efforts are being made to improve educational materials and how they should be presented to students.

SUMMARY

In one embodiment, a machine implemented method for using a graphical interface for developing a lesson plan having a plurality of keyframes for teaching a mathematical concept is provided. The content for each keyframe is associated with a database domain from among a plurality of database domains. The method includes selecting a gesture from a gesture set for controlling objects when displayed at an interactive display device for a first keyframe; associating a mutable variable for the first keyframe content with a gesture; defining a default condition for the mutable variable; adding one or more of text, label, dimension or expression to the first keyframe content; and establishing transition between the first keyframe and a next frame, using animation.

In another embodiment, a machine implemented method for presenting a lesson plan having a plurality of keyframes is provided. The method includes initializing a fixed variable for a first keyframe; detecting an input from a user at an interactive display device; correlating the input with a gesture from a gesture set and one or more of database domains from among a plurality of database domains; displaying an image at the interactive display device when all mutable variables for the first keyframe content are determined based on the input; manipulating the image using a gesture associated with the displayed image and any associated database domains; and transitioning to a next keyframe using animation.

In yet another embodiment, a system for delivering educational content is provided. The system includes an interactive display device operationally coupled to a presentation system and a computing system for presenting educational content. The presentation system is configured to initialize a fixed variable for a first keyframe; detect an input from a user at the interactive display device; correlate the input with a gesture from a gesture set and one or more of database domains from among a plurality of database domains; display an image at the interactive display device when all mutable variables for the first keyframe content are determined based on the input; manipulate the image using a gesture associated with the displayed image and any associated database domains; and transition to a next keyframe using animation.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 7 shows the architecture of a computing system used by the various embodiments.

DETAILED DESCRIPTION

In the following detailed description of the embodiments, reference is made to the accompanying drawings in which like references indicate similar elements, and in which is shown by way of illustration specific embodiments in which the invention may be practiced. These embodiments are described in sufficient detail to enable those skilled in the art to practice the embodiments, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

As preliminary note, the terms "component", "module", "system," and the like as used herein are intended to refer to a computer-related entity, either software-executing general purpose processor, hardware, firmware, and/or a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

To facilitate an understanding of the various embodiments of the present disclosure, the general architecture and operation of an interactive, classroom system is described first.

Figure 1:
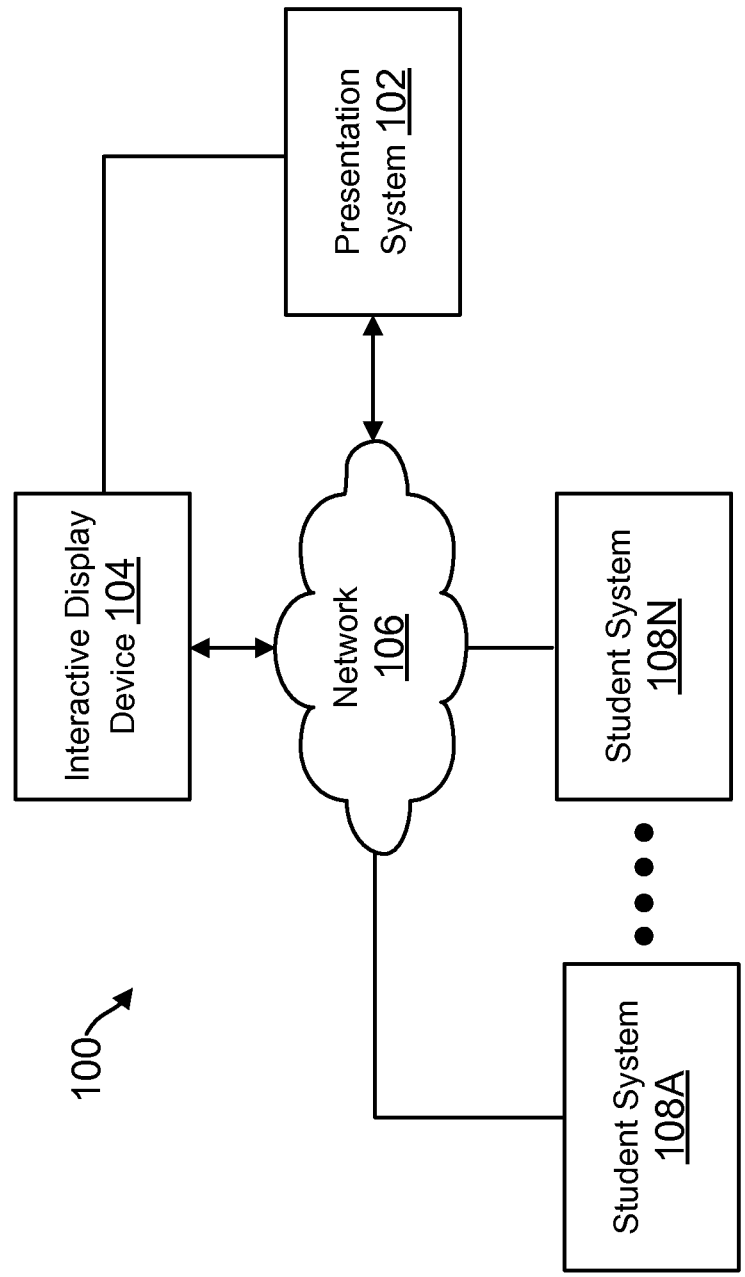
FIG. 1 illustrates an embodiment of a system for presenting educational material, according to one embodiment.

System 100: FIG. 1 shows an interactive system 100 having an interactive display device 104 and a presentation system 102 (may also be referred to as system 102). The display device 104 may be coupled to a network 106. The display device 104 can display content to a plurality of student systems 108A-108N that are operationally coupled to network 106. Presentation system 102 may be executed at a computing system that is directly coupled to the interactive display device 104 or remotely connected to the display device.

Interactive display device 104 may be a processor based display device that can receive a user input and display an image. An example of one such display device are the Smart Board Interactive White Boards provided by Smart Technologies Corporation.

Network 106 may be a local area network (LAN), wide area network (WAN), wireless network or any other network type. The student systems 108A-108N may be desktop computers, laptop computers, notebook computers, tablet computers, smart phones, personal digital assistants or any other computing device type. The embodiments disclosed herein are not limited to any computing device type or network type.

In one embodiment, presentation system 102 provides an interactive tool for imparting math education. Presentation system 102 allows a user (for example, an instructor in a classroom) to manipulate mathematical images, formulas and dimensions in real-time and over a wide range of dimensional and temporal values, as described below in more detail. Presentation system 102 simulates 2D (two-dimensional) and 3D (three-dimensional) operations for illustrating algebraic, geometric, numeric and arithmetic concepts using instructor driven animation. Presentation system 102 uses domain databases and gesture sets in conjunction with lesson plans, as described below.

In one embodiment, a user provides an input (for example, a draw path) using the interactive display device 104. User input is associated with mathematical concepts by using animation and allowing the user to reshape the lesson plan.

In one embodiment, a lesson plan is generated and may be presented in a plurality of modes providing different experiences for an instructor. For example, the lesson plan may be presented in an advanced mode, an auto-play mode or via a computing device visible to the instructor.

In the advanced mode, a user draw path is mapped to mathematical and symbolic libraries. An image is then displayed using animation frames, such that the displayed image appears to have been displayed based on the instructor's hand position but still bound by the lesson plan constraints. The user's draw path may advance or rewind the animation sequence as well as reconfigure the animation sequence based on the user's knowledge and familiarity with the presentation system.

In the auto-play mode, a default sequence allows the instructor to work through a lesson by either tapping the interactive display device using a pointing device, for example, a mouse or a digital pen, to advance through lesson plan slides. The term "slides" as used herein means what is displayed on the display device.

Figure 2:
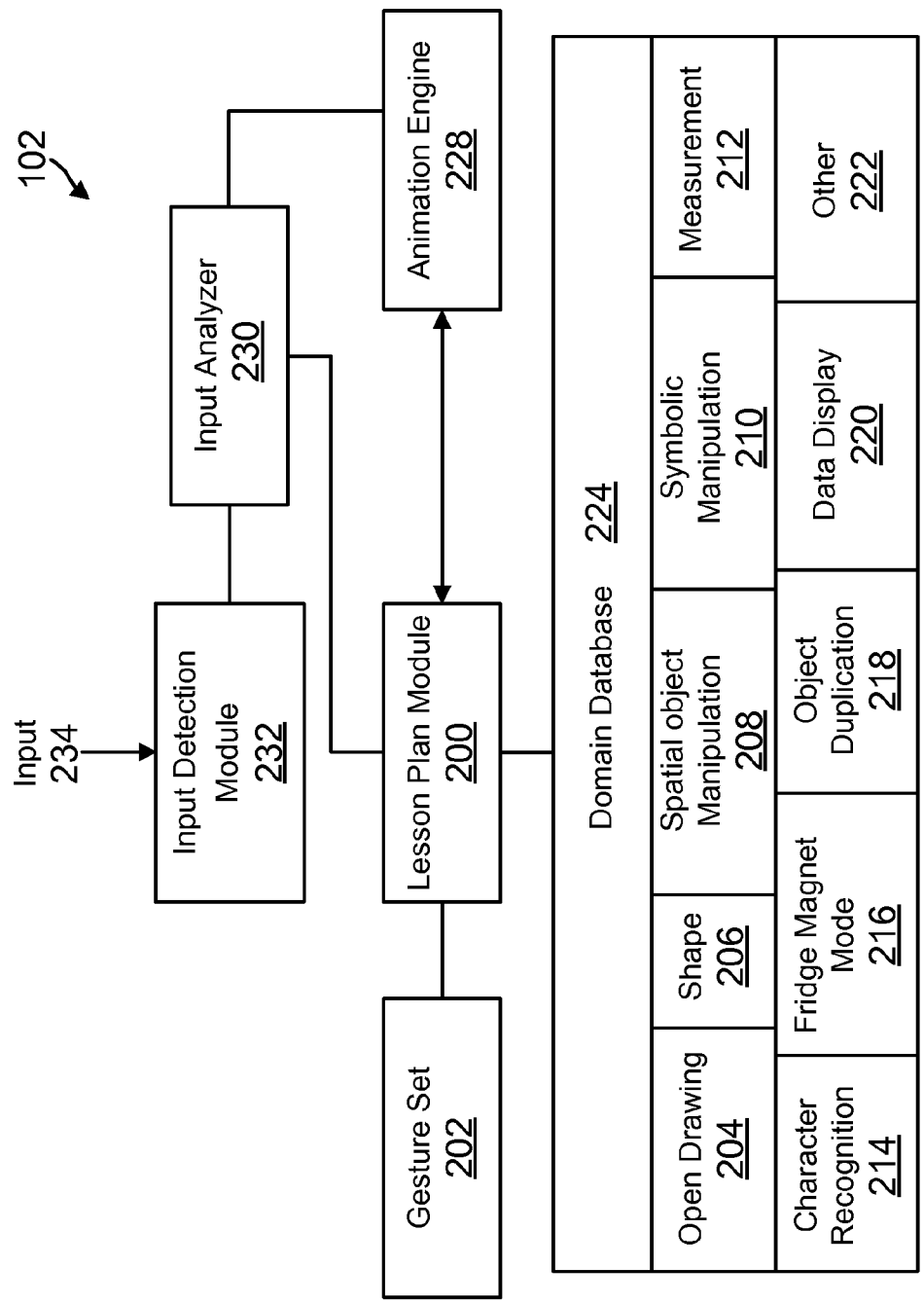
FIG. 2 shows an architecture of a presentation system, according to one embodiment.

FIG. 2 shows a block diagram of presentation system 102, according to one embodiment. The presentation system 102 includes a lesson plan module 200 that may be used to generate a lesson plan and store the lesson plan at a memory storage location. Lesson plan module 200 may provide a graphical user interface (GUI) on a display device to a user for building a lesson plan.

The lesson plan module 200 has access to a gesture set 202 and a domain database 224 that may have a plurality of domain databases (or data structures), as described below. Gesture set 202 may include a single touch, a multi touch and a 3D spatial control gestures. The single touch gesture allows a single gesture to control an object, relate to mutable variables (i.e. variables that may change) for the object and default conditions for mutable variables, as described below. The multi-touch gestures require more than one gesture and 3D spatial control allows 3D spatial gestures for controlling the object.

Domain database 224 may include a plurality of domains databases (may be referred to as domain), for example, an open drawing domain 204, a shape domain 206, a spatial object manipulation domain 208, a symbolic manipulation domain 210, a measurement domain 212, a character recognition domain 214, a fridge magnet mode domain 216, an object duplication domain 218, a data display domain 220 and any other domain 222.

The various domains may be associated with a keyframe of a lesson plan. The term keyframe as used herein means a pre-defined step in a presentation/animation sequence that includes definitions for content, display, animation transitions and user controls. Keyframes may be points within a lesson plan that permit presentation system 102 to pause and await an input from a user.

The Open Drawing domain 204 includes a database that translates hand motion (or draw paths) into freehand drawings.

The shape domain 206 may include a 2D Shape database as well as a 3D database. The 2D database includes 2D geometric shapes and forms such as lines, polygons, parallel and perpendicular lines, circles, ellipses, parabolas and others. The 2D Shape database may also include a 2D Extrusion segment that includes shapes that are expanded from a 2D view into a 3D view by stretching the 2D shape along a z axis. The gesture set associated with this domain allows for the extrusion to be positive or negative.

The 3D Shape database is used to interpret the draw path to directly create 3D shapes such as cones, spheres, cubes, tetrahedrons and others.

The Spatial Manipulation domain 208 includes a database that correlates with gesture sets to spin, slide, stretch, compress, flip, rotate and split objects that are 2D or 3D.

The Measurement domain 212 permits display of relative dimensions (based upon an original draw path that created 2D or 3D shapes or based upon stretching or compaction of those shapes) and dimensions based on user presentation design.

Character Recognition domain 214 includes a database that represents alphanumeric characters used in labels, words, equations, formulas and others. Symbolic Manipulation domain 210 is similar, but also includes draw path recognition to calculate formulas and equations of different orders.

Fridge Magnet Mode domain 216 includes a database that allows for objects, numbers, and formulas within a display to be individually "grabbed" and relocated on the display as the animation shows their "movement."

Object Duplication domain 218 includes a database that permits gestures to create multiple numbers of objects that are either already within a display, or are being retrieved from a shape database.

The Data Display domain 220 includes a database (and corresponding gesture sets) that provides computational cells in a table array onto the interactive display for manipulation.

Other domain 222 may include other user developed and defined database.

Presentation system 102 includes an input analyzer 230 that analyzes an input 234 received from a user via an input detection module 232. The input may be a draw path, a tap on the interactive display device 104 and others. The animation engine 228 provides animation in keyframes of a lesson plan, as described below in more detail.

Figure 3:
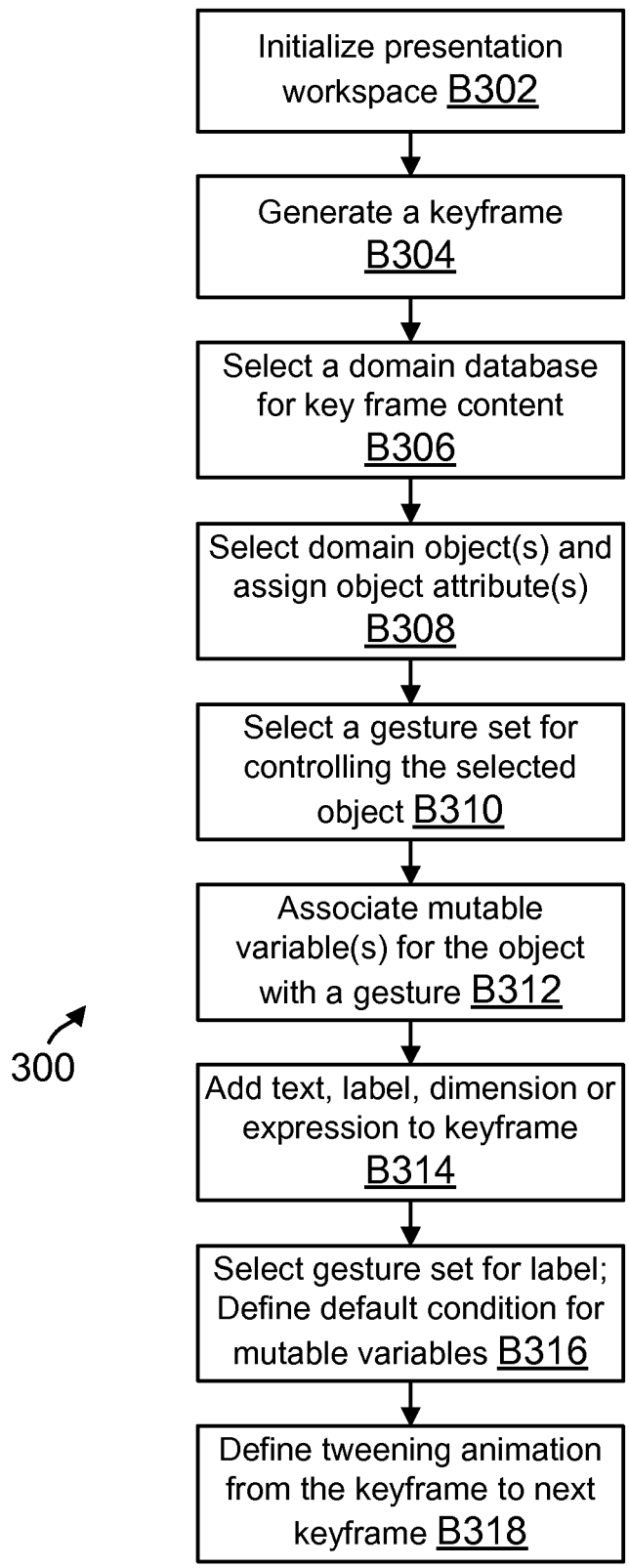
FIGS. 3-6 show various process flows for the various adaptive embodiments of the present disclosure.

Process Flows:

FIG. 3 shows a process 300 for generating a lesson plan, according to one embodiment. The lesson plan content is determined by an instructor. The content may include 2D and/or 3D representations from the shape domain 206, as well as graphical symbols. The shapes, symbols and alphanumeric characters may be stored in various libraries. The selection and placement of content within a keyframe may be performed using a drag-and-drop interface provided at a display device.

The user may sequence content and define user interaction type or draw path that drives transitions between keyframes of a lesson plan using animation engine 228. This may be enabled by specifying variables that may be fixed or mutable. Mutable variables may have default values as well as a range of values. The mutable variables may be managed during the presentation of the lesson plan.

Referring now to FIG. 3, the process 300 begins in block B302, when a presentation workspace is presented to a user on a display device. The workspace may be presented by lesson plan module 200 that may be a part of presentation system 102 or operate as a separate module.

In block B304, the user generates a keyframe for the lesson plan. In block B306, the user selects one or more domain from domain databases 224. The various domains have been described above in detail.

In block B306, objects from a domain are selected and are assigned fixed and mutable variables, where applicable. An example of a fixed variable in a lesson plan may be a color that may be used to fill different shapes in a lesson plan for teaching about geometrical shapes, for example, parallelograms, as described below with respect to FIGS. 8A-8D, described below in detail. An example of a mutable variable may be the height and width of a geometrical shape.

In block B310, a gesture set is associated with the selected objects. In block B312, mutable variables are associated with the gestures that may have been selected from a gesture set.

In block B314, text, labels, dimensions or an expression are added to the keyframe. In block B316, a gesture set is added for the labels. Default conditions for the mutable variables are also defined.

In block B318, tweening is defined from this keyframe to a next keyframe in the lesson plan. The term tweening as used in animation enables an object to move from a starting position to an end position, as well as change its properties. Tweening as used herein may be pre-defined or programmed to develop transitions that satisfy mathematical constructs. The process blocks B302-B318 are then repeated, until all the keyframes for the presentation have been created.

Figure 4:
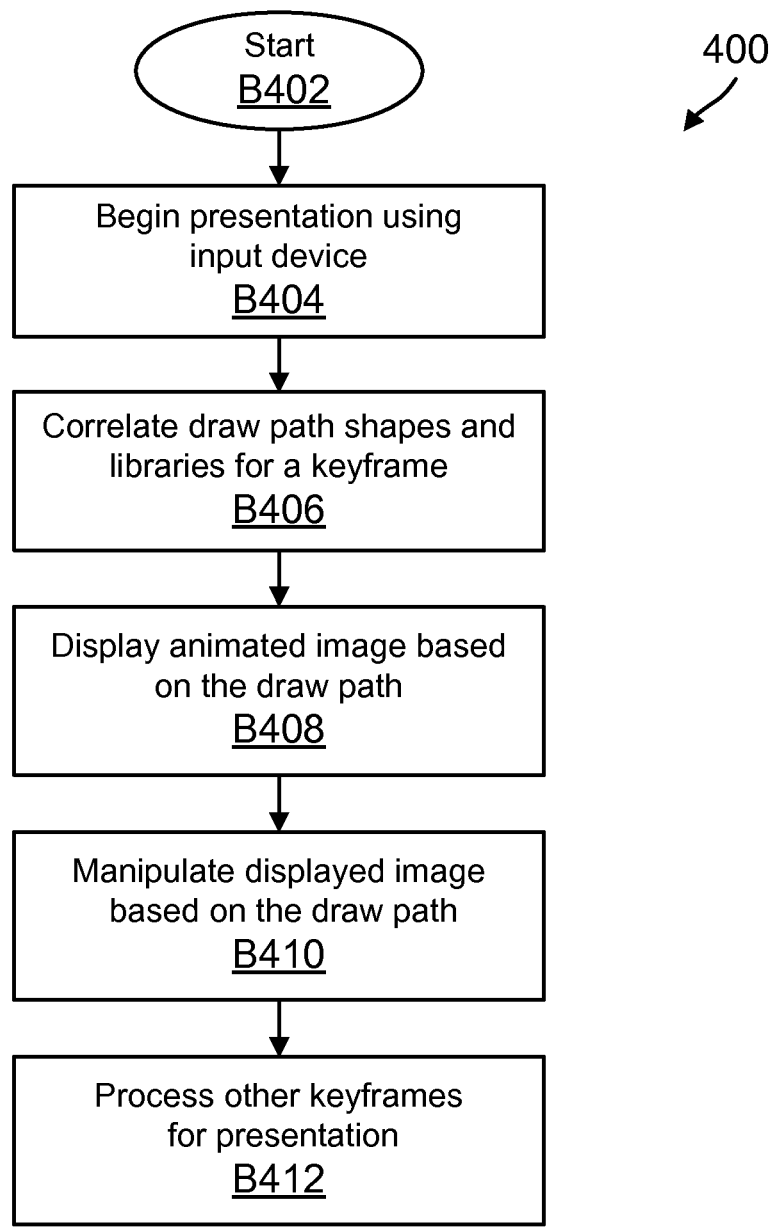

FIG. 4 shows a process 400 for presenting a lesson, according to one embodiment. During the presentation, system 102 interprets a user's draw path (or a valid user input i.e. a non-spurious user input, used interchangeably throughout this specification), reproduces the draw path on the display device 104, correlates the trace with pre-defined domain database elements to display a finished graphic that aids students in learning the objective of the lesson plan. The draw path is mapped to a library and objects. Insignificant taps on the interactive display device 104 or gestures are ignored if they do not relate to the lesson plan. When a gesture is insufficient, then a default may be displayed to transition to the next slide or correlate with a next slide. The draw path determines what slide or animation is generated next in sequence. Thus, prior states define future states.

Tweening between slides may be defined in the lesson plan, as described above. It is noteworthy that one does not have to work in the same slide order as was developed in the lesson plan. Instead, one can simply work with an image displayed at a given time. For example, if a lesson is to teach one about parallelograms, then the draw paths can be made to correlate with that content. Thus, if a user draws a circle, the system interprets it as a rectangle or a parallelogram.

Animation engine 228 responds to the user draw path and the response may be changed within a same keyframe or changed in making a transition from one keyframe to the next. The variables or animation attributes are associated with the visual elements in the keyframe, for example, dimensions, relative scaling, orientation, and speed of motion, path of travel or relationship with other objects.

Referring now to FIG. 4, process 400 begins in block B402, when student systems 108A-108N, presentation system 102 and the display device 104 are all initialized and operational. A lesson plan is selected by the user from a plurality of lesson plans stored at a storage device. In block B404, the user provides an input on the display device, for example, a draw path. In block B406, the input is detected and the draw path is correlated with shapes and libraries for the first keyframe of the lesson plan.

Based on the draw path, in block B408, animation may be displayed. The user may then manipulate the displayed image in block B410 to move the next slide. Thereafter, in block B412, the user moves to other keyframes, until the presentation is complete. Examples of process 400 are provided below with respect to FIGS. 8-9.

Figure 5:
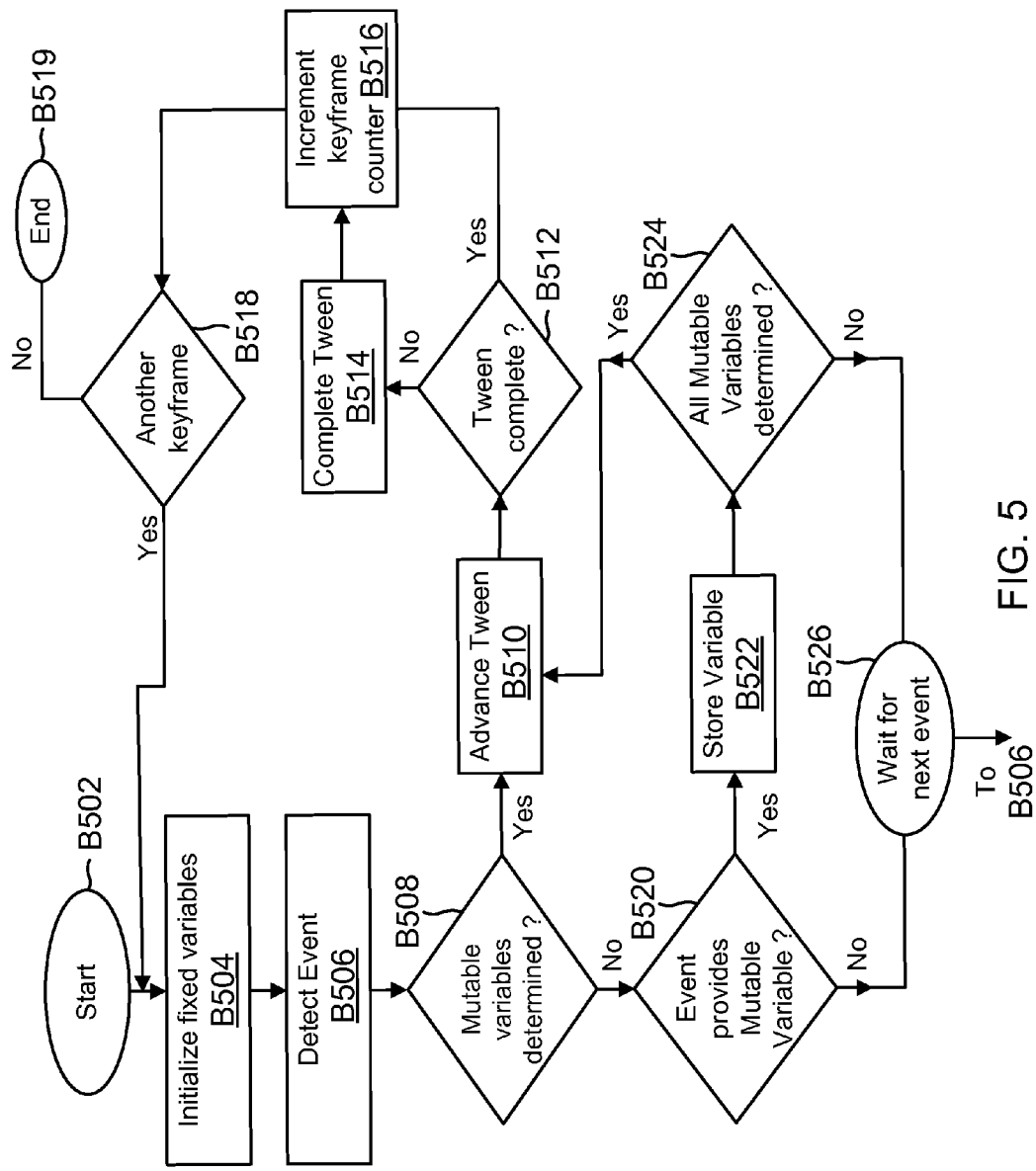

FIG. 5 is a detailed process 500 for animating a presentation, according to one embodiment. The process begins in block B502 when a presentation based on a previous lesson plan developed using the process of FIG. 3 is started. The presentation may have a first keyframe, followed by other keyframes.

In block B504, the fixed variables for the first keyframe are initialized. The process then waits to detect an event in block B506. The event in this context may be a tap on the interactive display device 104, a draw path that the user draws on the display device or any other input type. The event is detected by the input detection module 232.

In block B508, the process determines if all the mutable variables for the keyframe have been determined by interpolating the draw path. If yes, then in block 510, advances a tween.

In block B512, the process determines if tweening is complete. If yes, then the process moves to block B516, when a keyframe counter is incremented. The counter is maintained by the presentation system 102 to track keyframe display. If tweening is not complete, then in block B514, tweening is completed and the process moves to block B516 that has been described above.

In block B518, the process determines if there is another keyframe. If yes, then the process moves to block B504, otherwise the process ends in block B519.

Referring back to block B508, if all the mutable variables for the keyframe have not been fully determined, the process determines in block B520, whether the event provides mutable variables. If the event does not provide mutable variables, then the process waits for a next event in block B526 and reverts back to block B506.

If the event does provide mutable variables, then the mutable variables are stored in block B522. The mutable variables may be stored at a memory location accessible to the animation engine 228. This allows the user to rework contents of a keyframe to illustrate any variations for a theme that is taught by a presentation. Thus, one animation may run a key frame one way to show a slide a certain way and another animation may run the keyframe differently showing a slide that may be different than the first slide.

The process in block B524, determines if all the mutable variables have been determined. If yes, then the process moves to block B510, otherwise the process waits for a next event in block B526.

Figure 6:
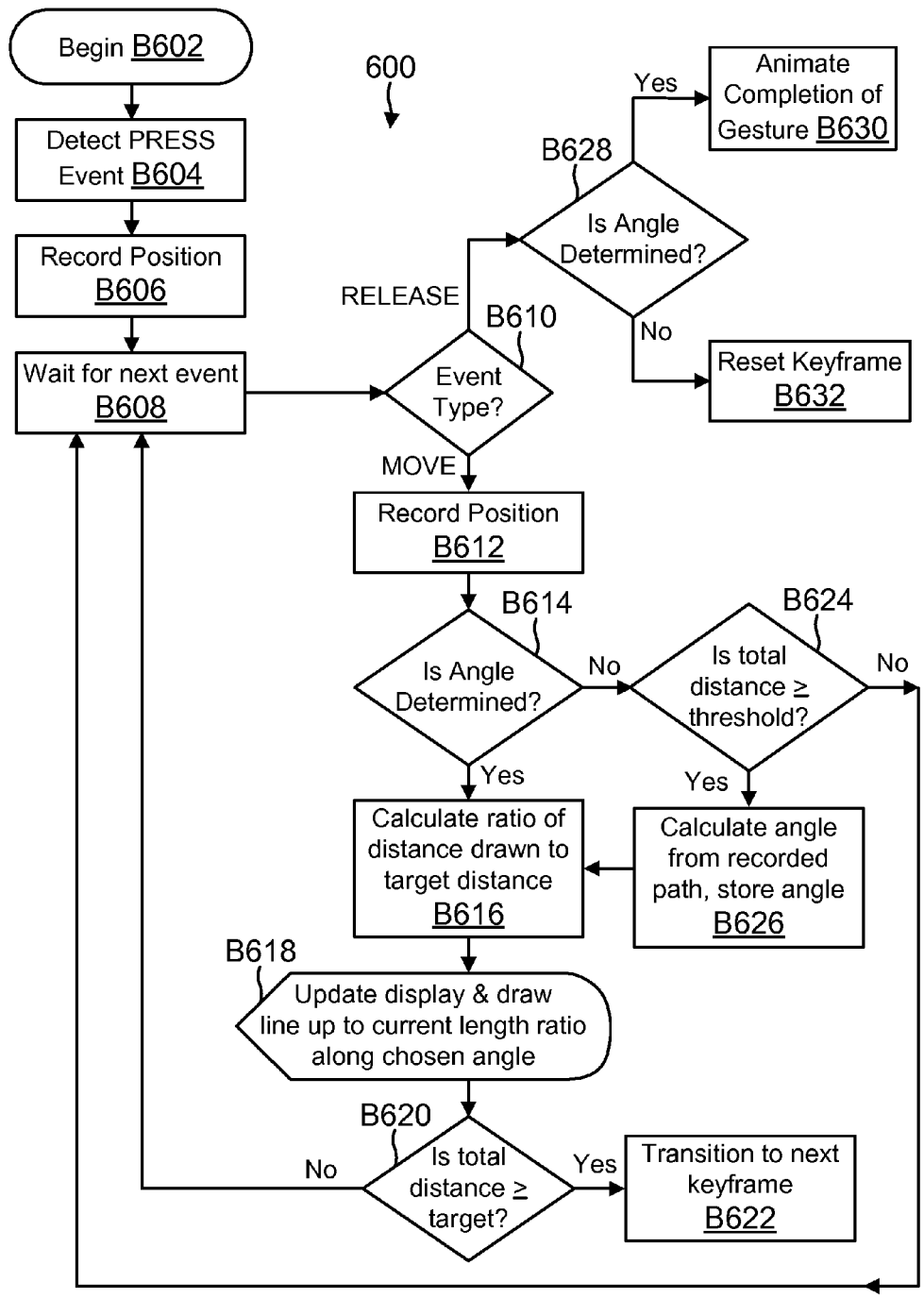

FIG. 6 shows a process 600 as an example of correlating a draw path to a straight line from the shape domain 206.

The process begins in block B602, when a user provides an input, for example, the user starts to draw on the display device 104. The beginning of the event is detected in block B604. The input analyzer 230 records the initial position of the draw path at a memory location in block B606. The input analyzer then waits for a next event in block B608.

After the event is received, the input analyzer 230 determines the event type in block B610. For example, the event type may be a "move" or a "release". In "move" event, the user extends the draw path from block B604. For the release event, the user releases the input from the display device 104.

When the event is a move, the input analyzer 230 records the "next" position in block B612 and then evaluates if an angle may be determined in block B614. If yes, then the input analyzer 230 determines a ratio of a distance that has been drawn to a target distance. Based on that, in block B618, the display on the display device 104 is updated and a line is drawn up to a current length ratio along the chosen angle.

In block B620, the total distance of the line is compared to the target distance. If the actual distance is equal to or greater than the target distance, then the process moves to block B622, when the presentation transitions to a next keyframe. If the distance is not greater than or equal to the target distance, then, the process moves back to block B622. The target distance may be specified in the keyframe for a presentation.

If the angle is not determined in block B614, then the process determines if the total distance from the draw path is greater than or equal to a threshold value. For this example of a 2D line, the threshold value may be used to establish a minimum amount of movement (e.g. the draw path) that may be needed to display a line segment of minimum length. If the threshold value is reached, then in block B626, the angle from the recorded path is determined and stored. The process then moves to block B616. If the threshold is not reached in block B624, then the process moves to block B608.

Referring back to block B610, if the event type is a "release", then in block B628, the process evaluates if the angle may be determined. If yes, then the animation associated with the gesture is completed in block B630, otherwise, the frame is reset in block B632.

Although the process described above is for generating a simple shape from the 2D domain, a similar process, with varying levels of draw path interpolations, is used for other domains and gesture sets.

The processors 702 are the central processing units (CPUs) of the processing system 700 and, thus, control its overall operation. In certain embodiments, the processors 702 accomplish this by executing programmable instructions stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

Memory 704 represents any form of random access memory (RAM), read-only memory (ROM), flash memory, or the like, or a combination of such devices. Memory 704 includes the main memory of the processing system 700. Instructions, for example, for the presentation system 102 which implements techniques introduced above may reside in and may be executed (by processors 704) from memory 704.

Also connected to the processors 702 through the bus system 706 are one or more internal mass storage devices 710, and a network interface 708. Internal mass storage devices 710 may be or may include any conventional medium for storing large volumes of data in a non-volatile manner, such as one or more magnetic or optical based disks. The Processing System:

FIG. 7 is a high-level block diagram showing an example of the architecture of a processing system, in which executable instructions as described above can be implemented. The processing system 700 can represent a computing device executing the presentation system, interactive display device 104, student systems 108A-108N and other components. Note that certain standard and well-known components which are not germane to the present disclosure are not shown in FIG. 7.

The processing system 700 includes one or more processors 702 and memory 704, coupled to a bus system 706. The bus system 706 shown in FIG. 7 is an abstraction that represents any one or more separate physical buses and/or point-to-point connections, connected by appropriate bridges, adapters and/or controllers. The bus system 706, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). network interface 708 provides the processing system 700 with the ability to communicate with remote devices and systems via network 106.

Processing system 700 also includes a display interface 712 that interfaces with the interactive display device 102. The processing system 700 may also include one or more input/output (I/O) devices (not shown) that may include, for example, a display device, a keyboard, a mouse, etc.

Figures 1, 8A:
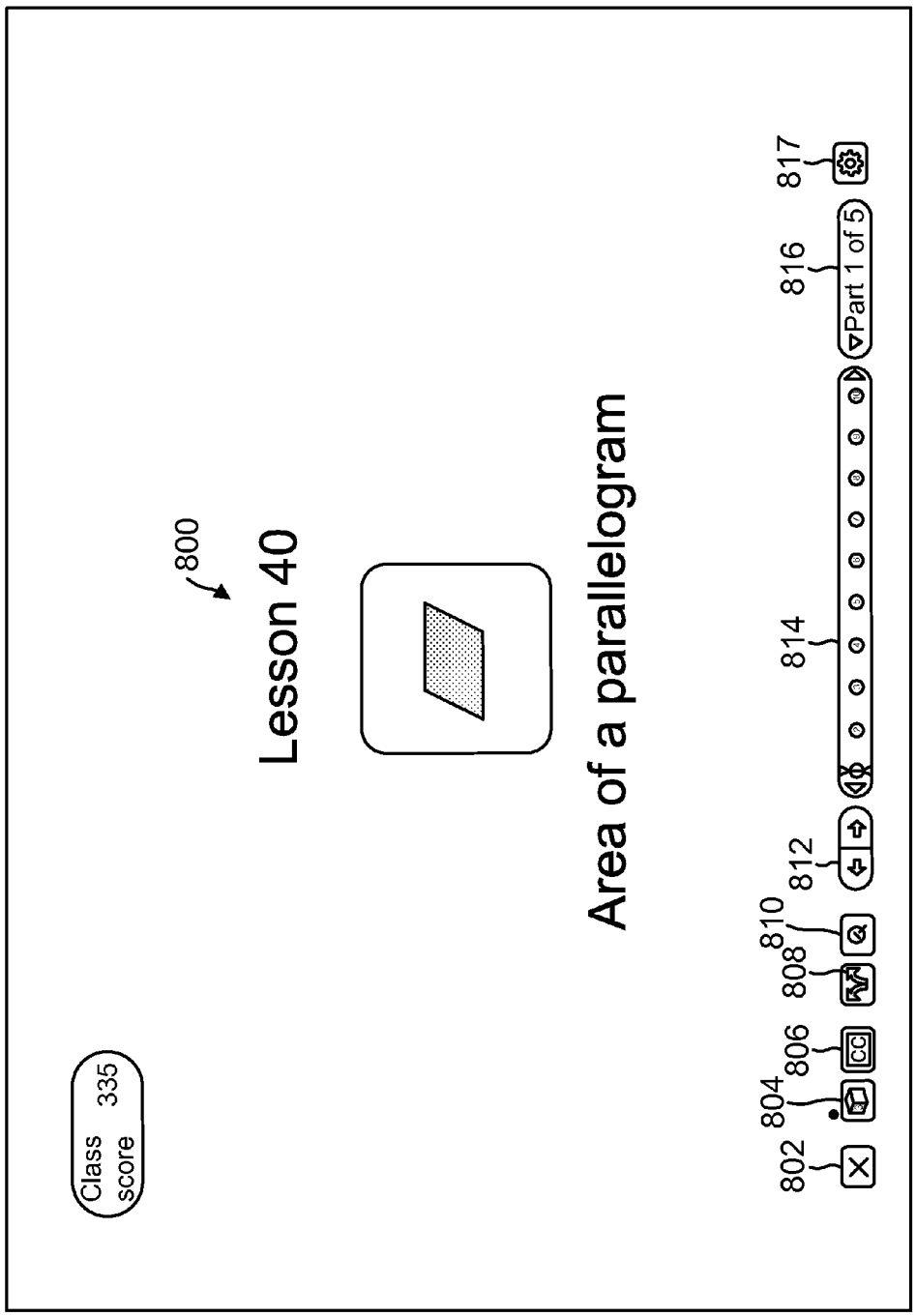
FIGS. 8A-8D (8A-1 to 8A-4, 8B-1 to 8B-4, 8C-1 to 8C-4 and 8D-1 to 8D-4) and 9A-9D (9A-1 to 9A-2, 9B-1 to 9B-2, 9C-1 to 9C-2 and 9D-1 to 9D-3) show examples of lesson plans presented using the embodiments of the present disclosure.
Figures 2, 8A:
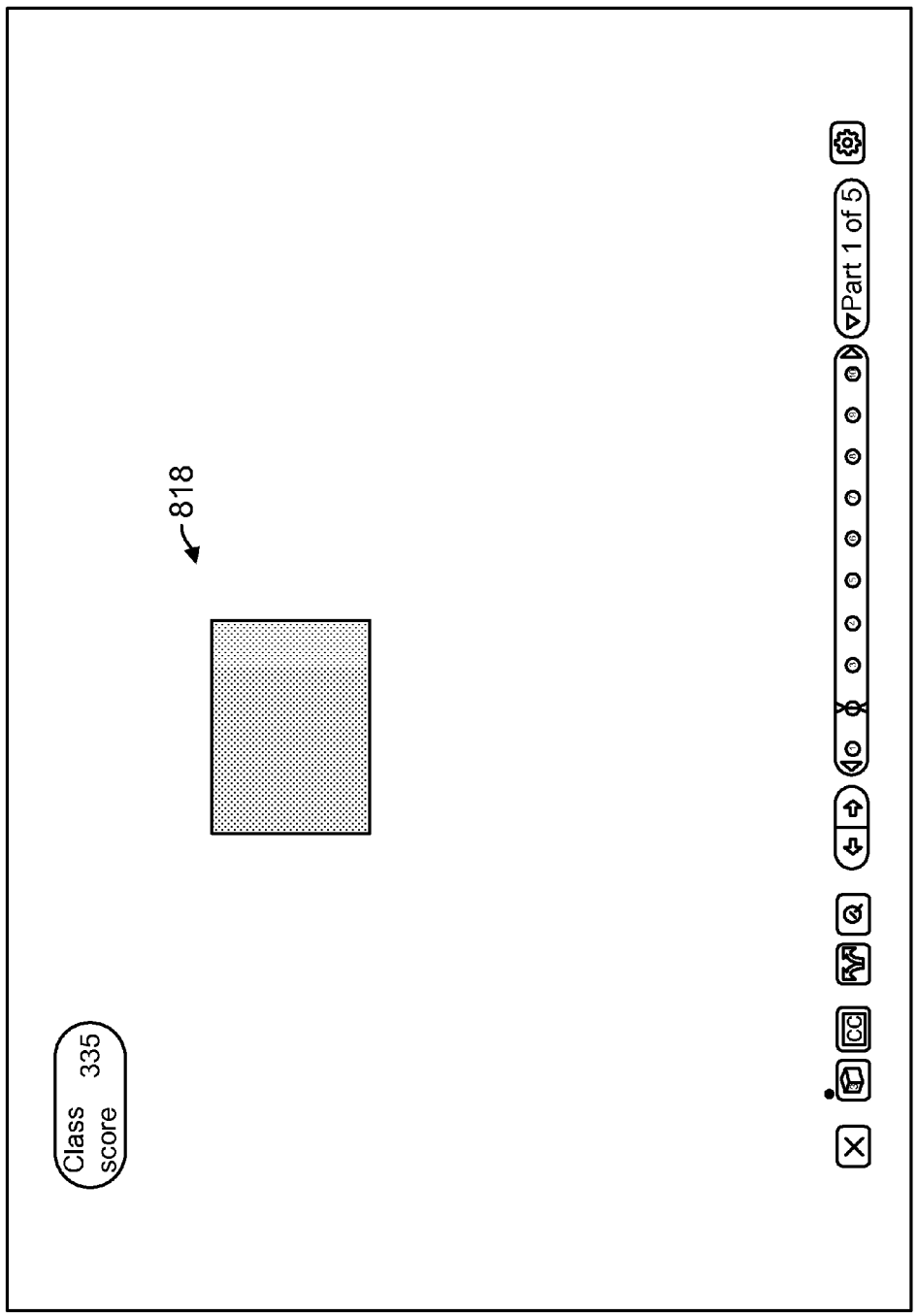
Figures 3, 8A:
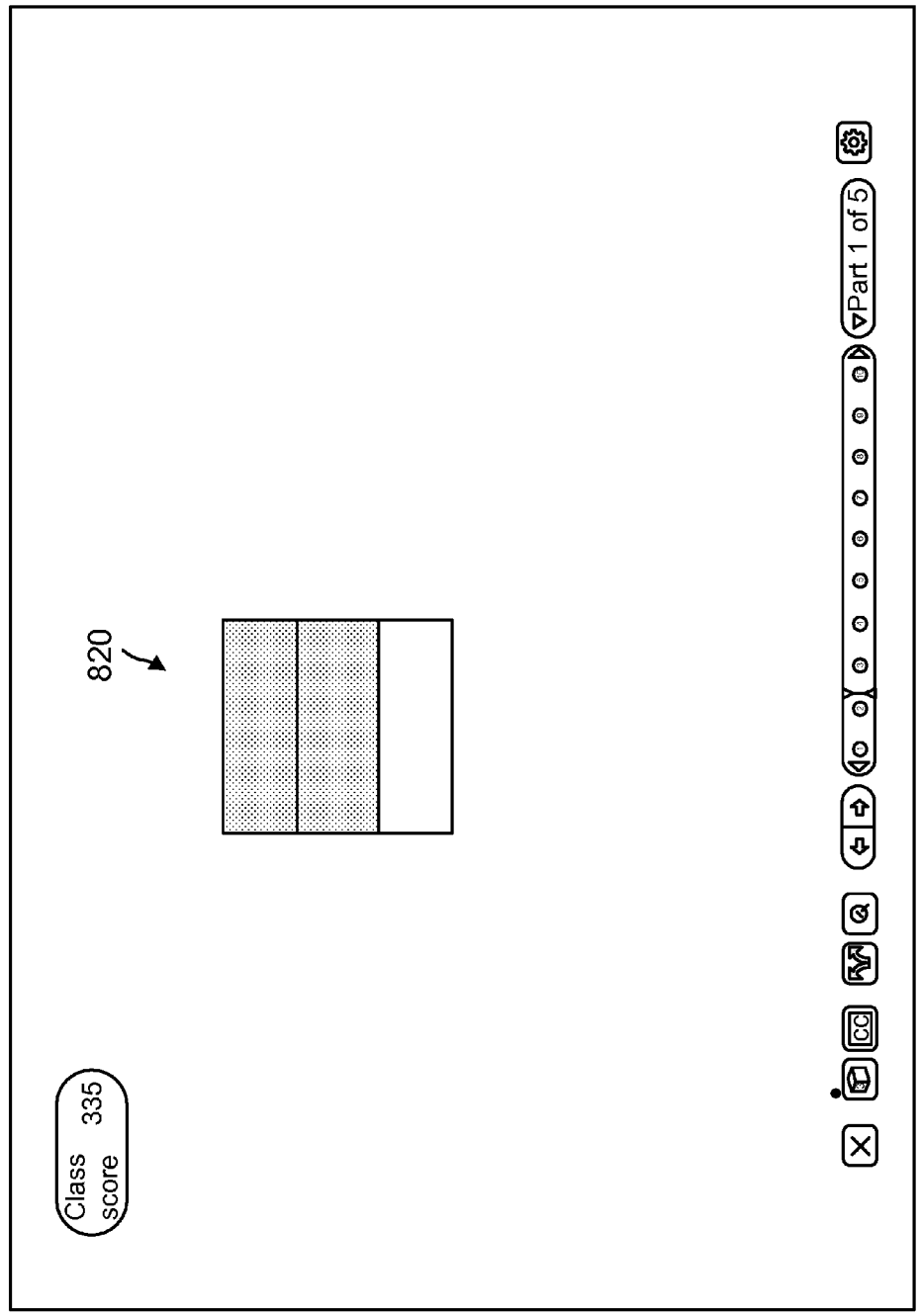
Figures 4, 8A:
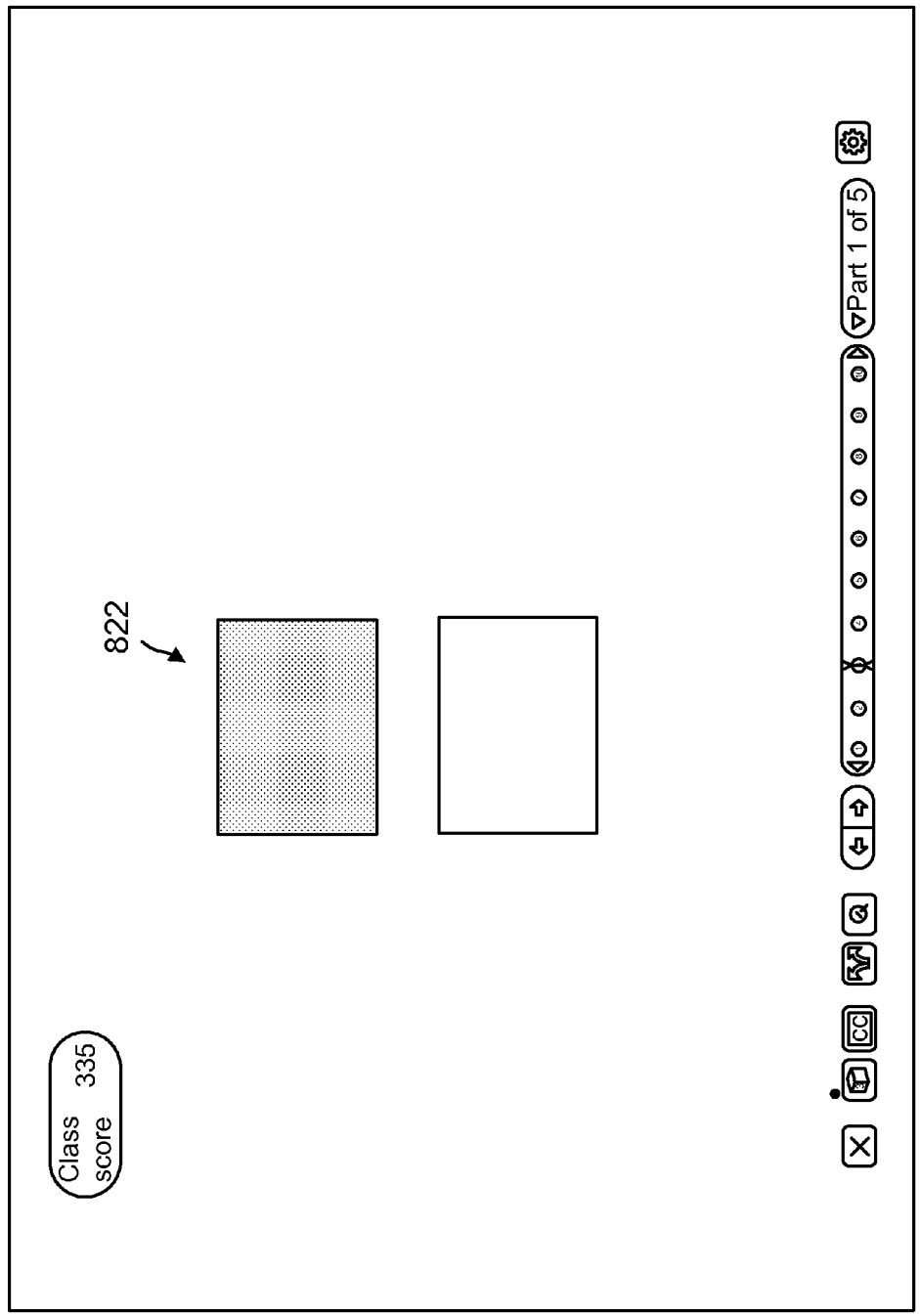

Lesson Plan Examples:

FIGS. 8A-1-8A-4 show an example of presenting a lesson plan to teach how an area of a parallelogram can be determined, using the system of FIG. 1 and the process flows of FIGS. 4-6, described above. Each slide in the presentation is animated with both the user's input and preprogrammed response animations, but selected screen shots are provided in this description. The lesson plan illustrates the relationship between the area of a rectangle and a parallelogram in a spatial-temporal manner by building upon a student's familiarity with how water fills containers of varying shapes.

The lesson plan provides a visual rationale for an equation that defines the area of a parallelogram. The user drags rectangles and parallelograms onto the screen and changes the dimensions of those shapes. The user can also add faucet elements to the shapes to signify a tank of water. The user can tap to animate the tank and drain the water into another shape of equal or unequal area. If the new shape is smaller than the tank, the animation shows that water overflows. If the shape is larger than the tank, the water does not completely fill the new shape.

At the end of the presentation, the user can cut a triangle from a rectangle, reposition the triangle to build a parallelogram, and show equivalent areas for both geometric shapes. The user can also use his finger to bring the text and equations on the display device.

The lesson begins with a display 800 having a tool bar with a plurality of icons. Icon 802 is used to end a presentation. Icon 804 is used to alternate numeric elements (if any) from decimal form to fractional or literal form.

Icon 806 is used to provide captioning, while icon 808 is used to push out a question to students' computing systems. Icon 810 allows the instructor to run the presentation in an auto-mode without any instructor input. Icon 812 provides arrows for paging through a presentation. Icon 814 provides a time line or navigation bar for scrolling through the presentation in forward or reverse direction. Icon 816 provides a menu for moving to other lessons and icon 817 is used to adjust the display.

Display 818 (FIG. 8A-2) shows that a user has drawn a rectangle and fills it with a color (for example, blue) Display 820 (FIG. 8A-4) shows that the user has drawn a colored rectangle and an empty rectangle. The user then in display 822 (FIG. 8A-4) copies the rectangle without color to denote an empty tank.

Figures 3, 8B:
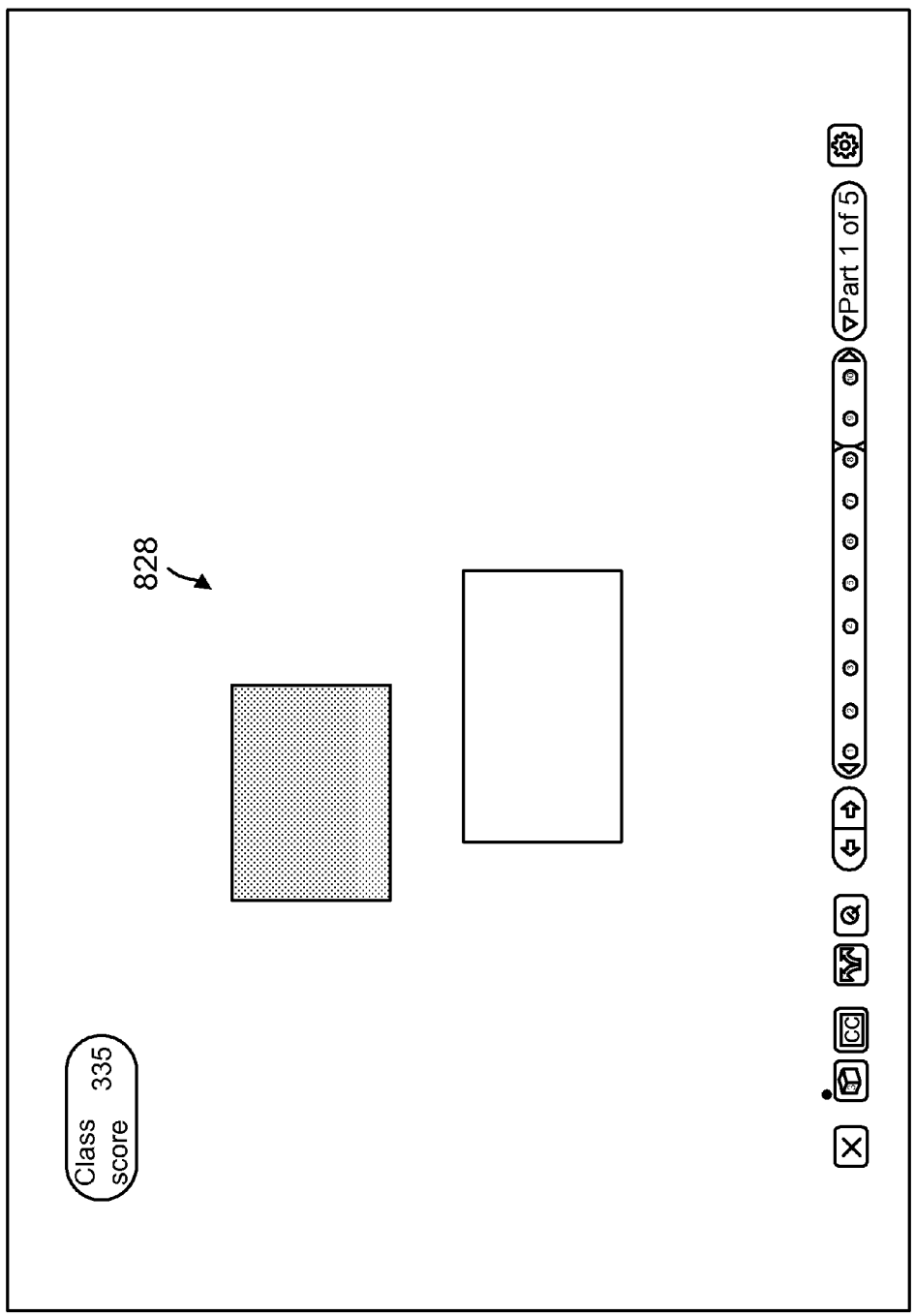
Figures 4, 8B:
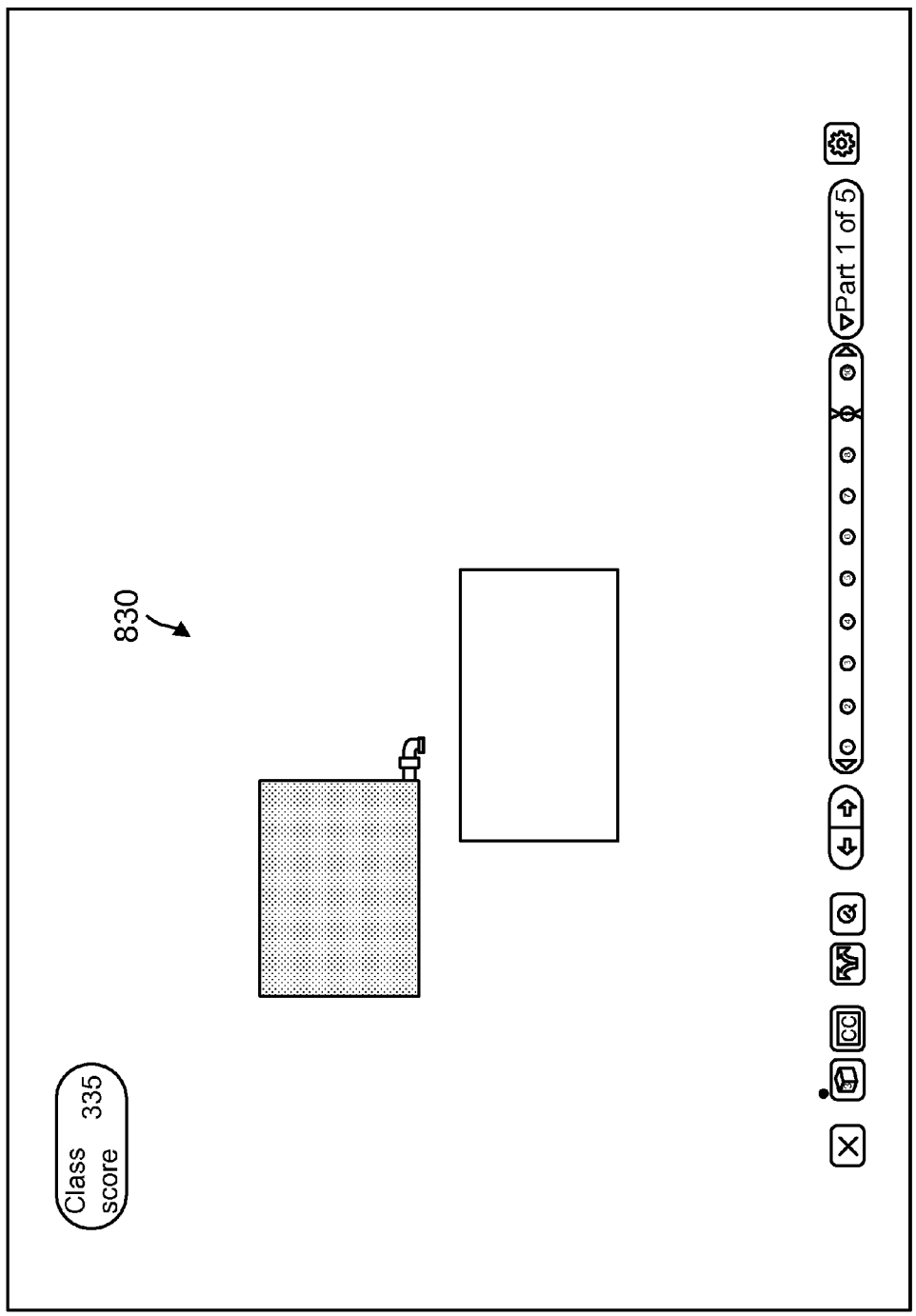

In FIG. 8B (8B-1 to 8B-4), using single touch gesture sets associated with the 2D-shape domain 206, object duplication domain 218 and spatial object manipulation domain 208, the user continues to guide through the presentation. Display 824 (FIG. 8B-1) shows an empty rectangle below the full tank. In display 826 (FIG. 8B-2), the user shows that water emptying from the top tank begins to fill the lower rectangle, but then overflows because the lower rectangle is smaller. In display 828 (FIG. 8B-3), the user creates an empty rectangle that is bigger than the top rectangle by copying the upper rectangle, dragging it into position, and then enlarging it to a size the user selects. The user adds a spigot in display 830 (FIG. 8B-4), which is used to fill up the lower rectangle.

Figures 1, 8C:
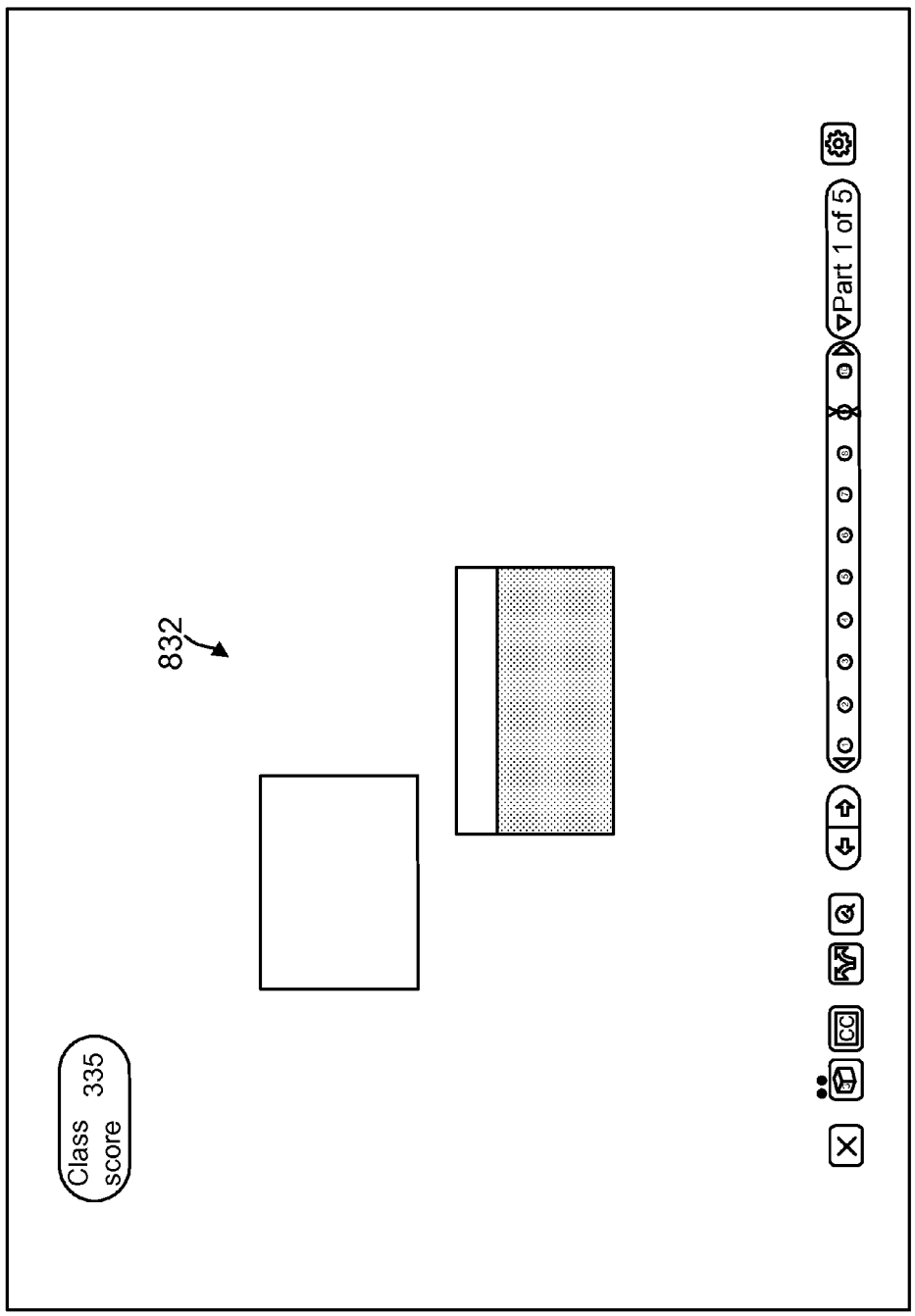
Figures 2, 8C:
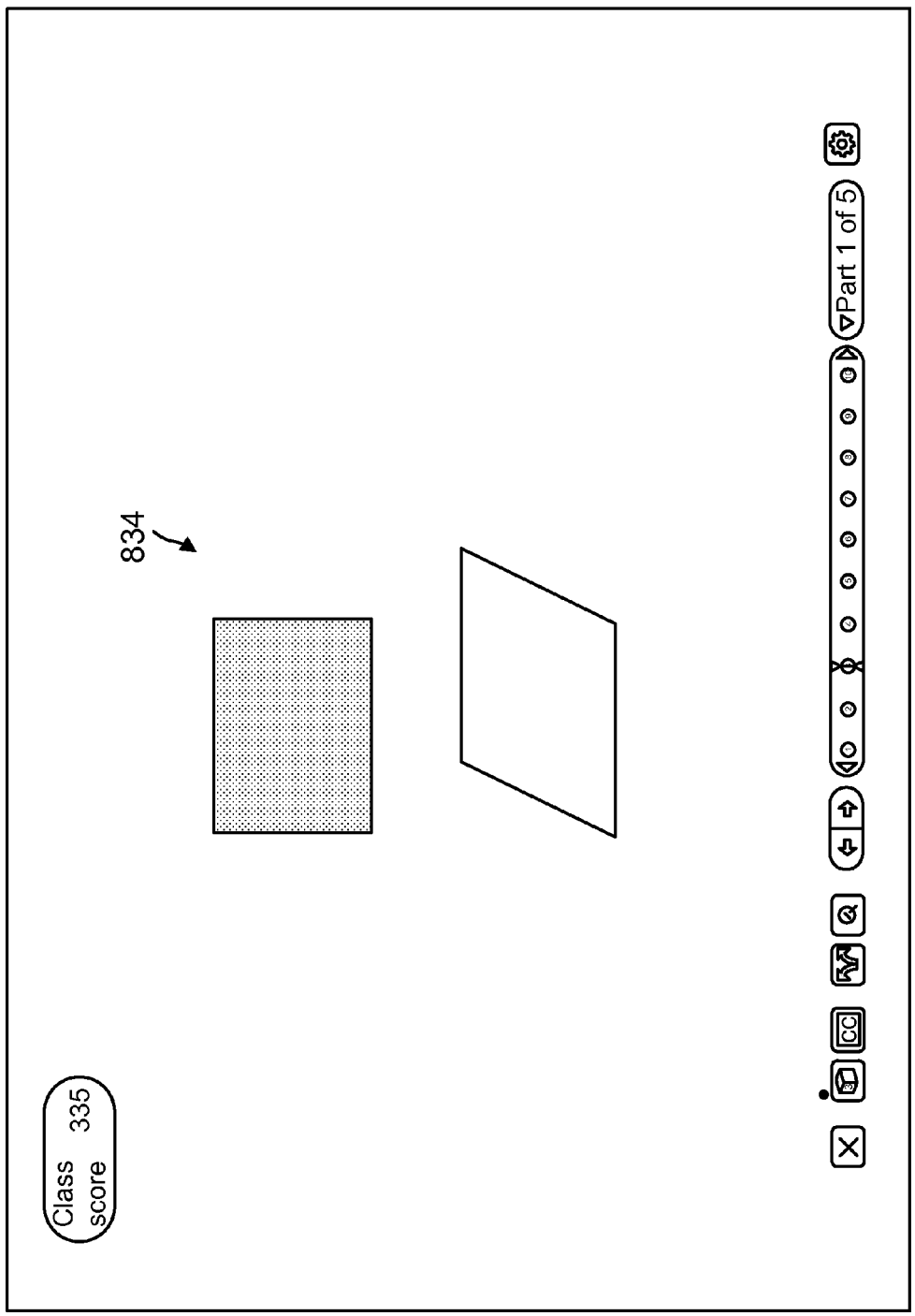
Figures 3, 8C:
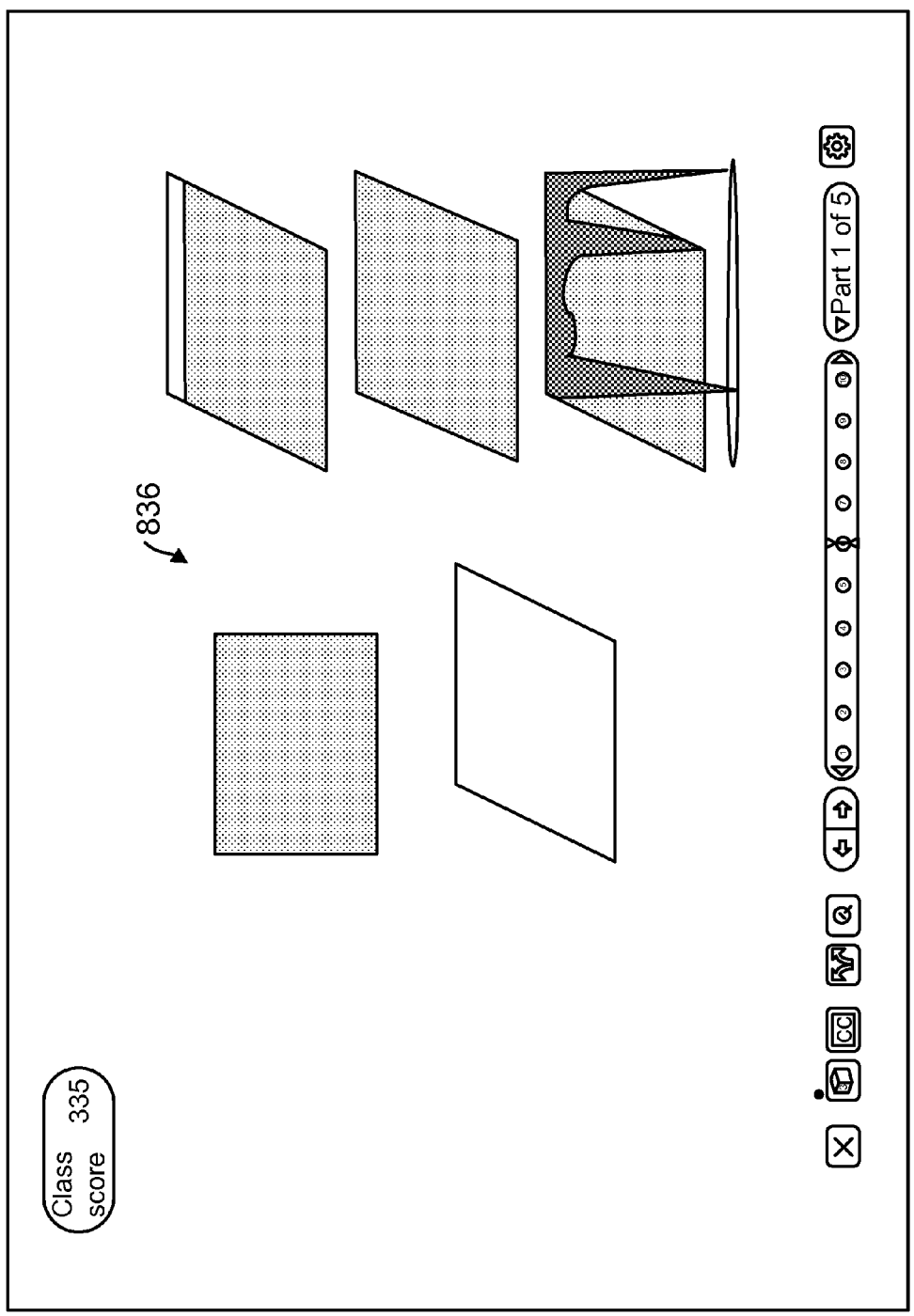
Figures 4, 8C:
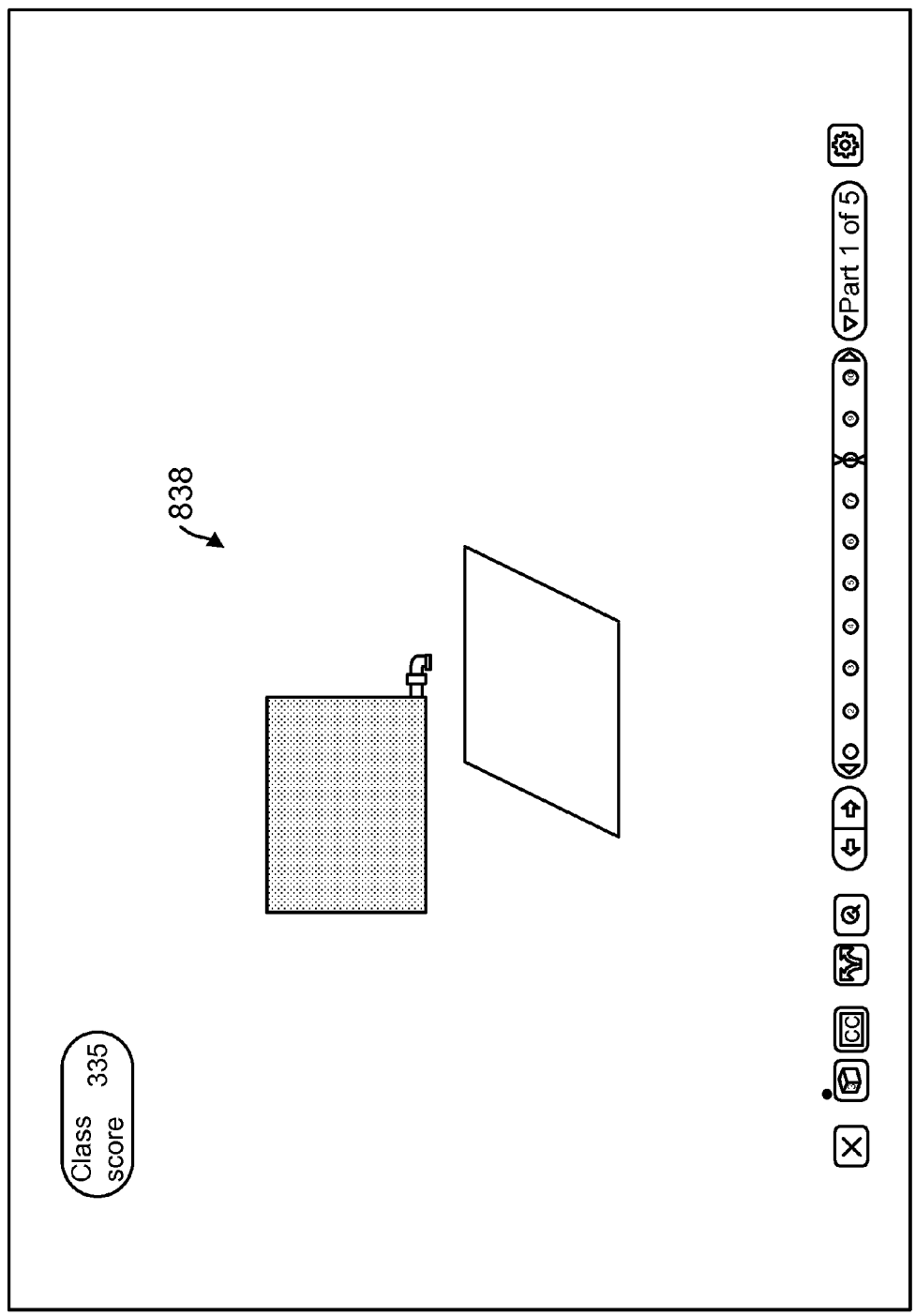

In FIG. 8C (8C-1 to 8C-4), the user drains the water using the spigot and display 832 (FIG. 8C-1) shows that water from the upper rectangle has flowed into the larger lower rectangle. The water level line that is animated is proportionate to the size rectangle that the user created in display 828.

In display 834 (FIG. 8C-2), the user copies another rectangle but changes the corner angles, without changing the area enclosed by the resulting polygon. The user then poses a question to the students regarding the relationship between the area of a parallelogram and area of a rectangle before progressing to the next portion of the presentation.

Displays 836 (FIG. 8C-3) shows the three possible solutions to the question of how the water from the rectangle will fill the parallelogram. Each solution animates the relative area of the rectangle compared to different parallelogram sizes. Students may respond verbally as in a traditional classroom, or may use the student computing devices 108 to choose a potential solution. In display 838 (FIG. 8C-4), the user starts the spigot animation to allow water to flow from the rectangle to the parallelogram.

Figures 1, 8D:
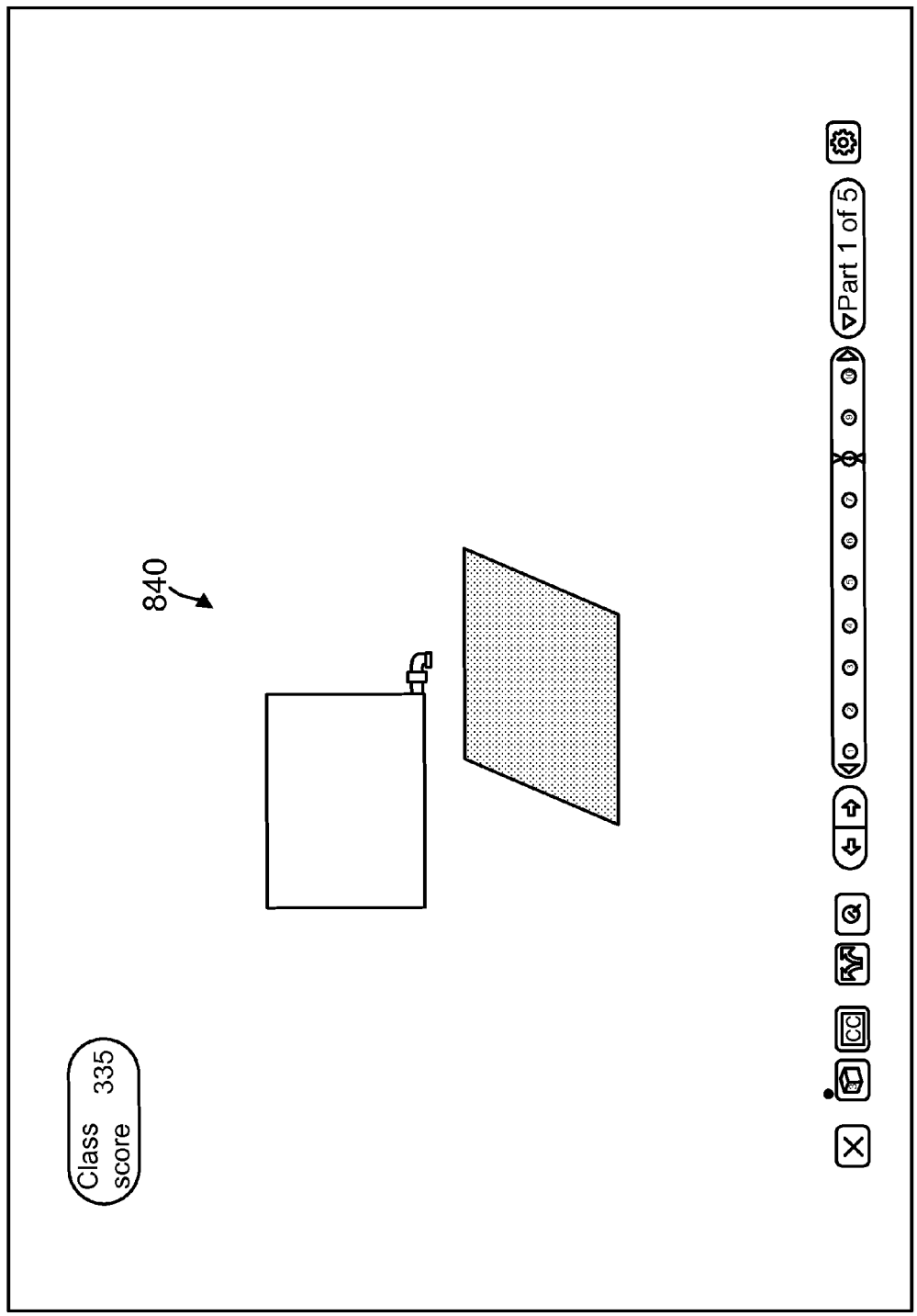
Figures 2, 8D:
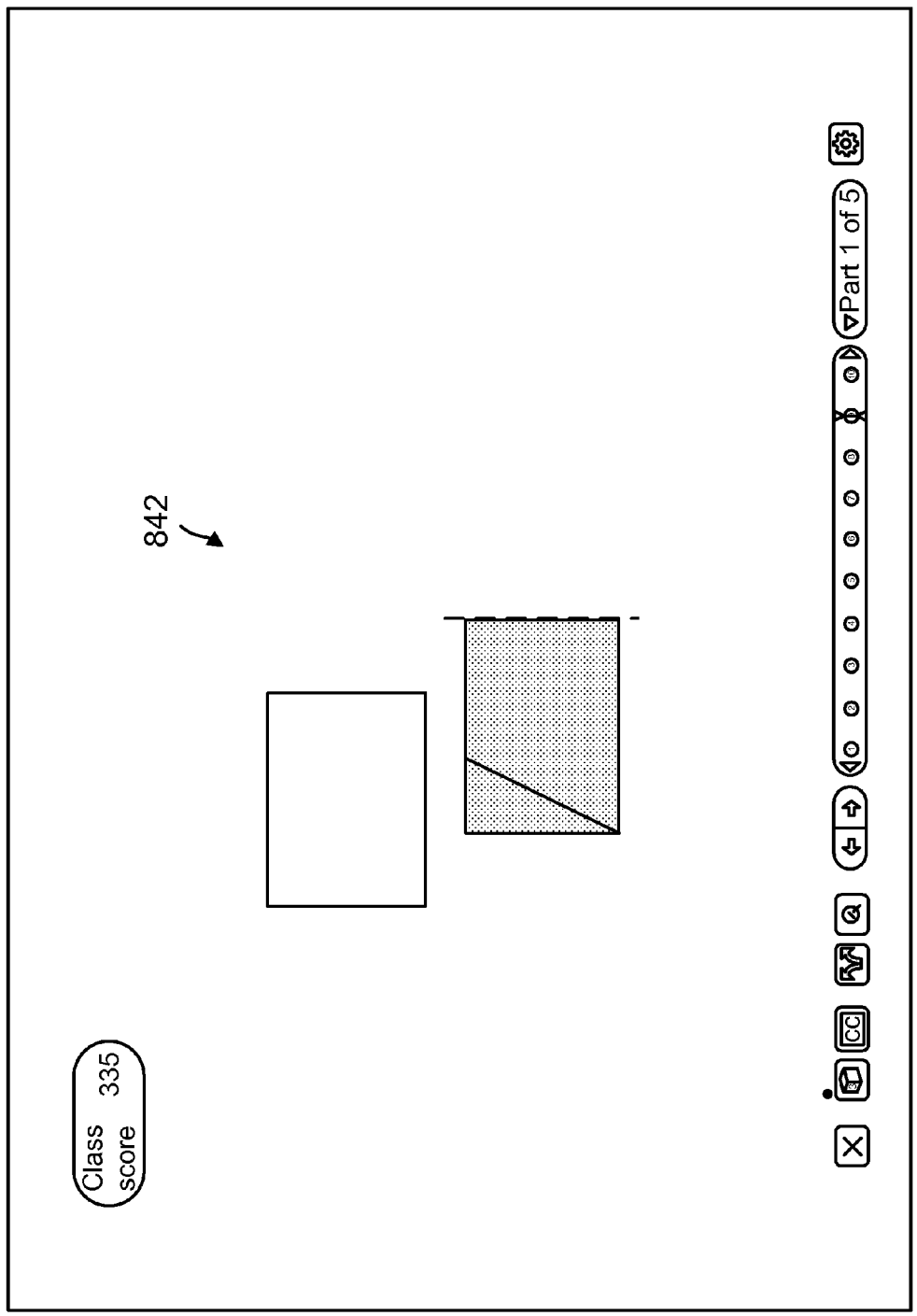
Figures 3, 8D:
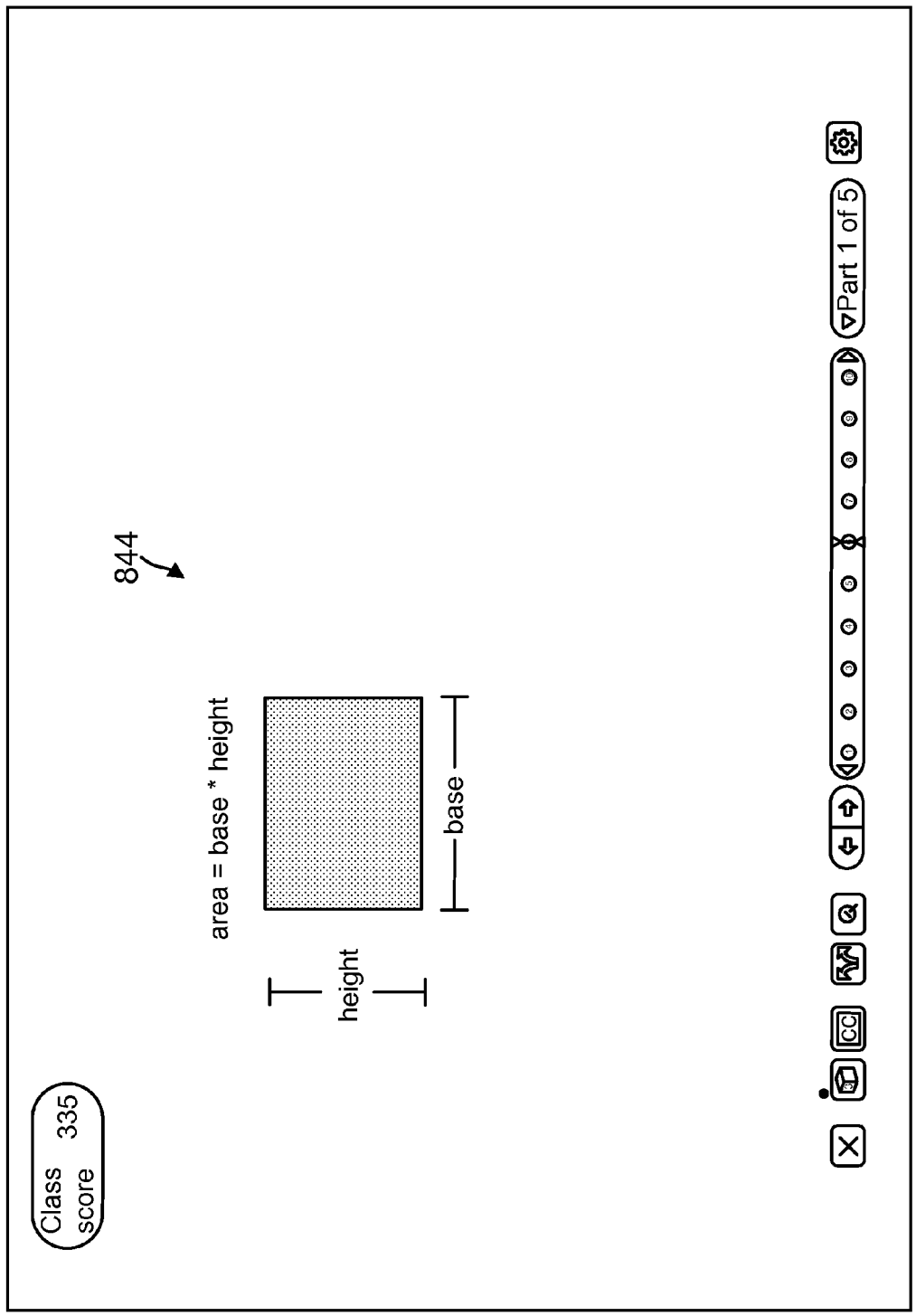
Figures 4, 8D:
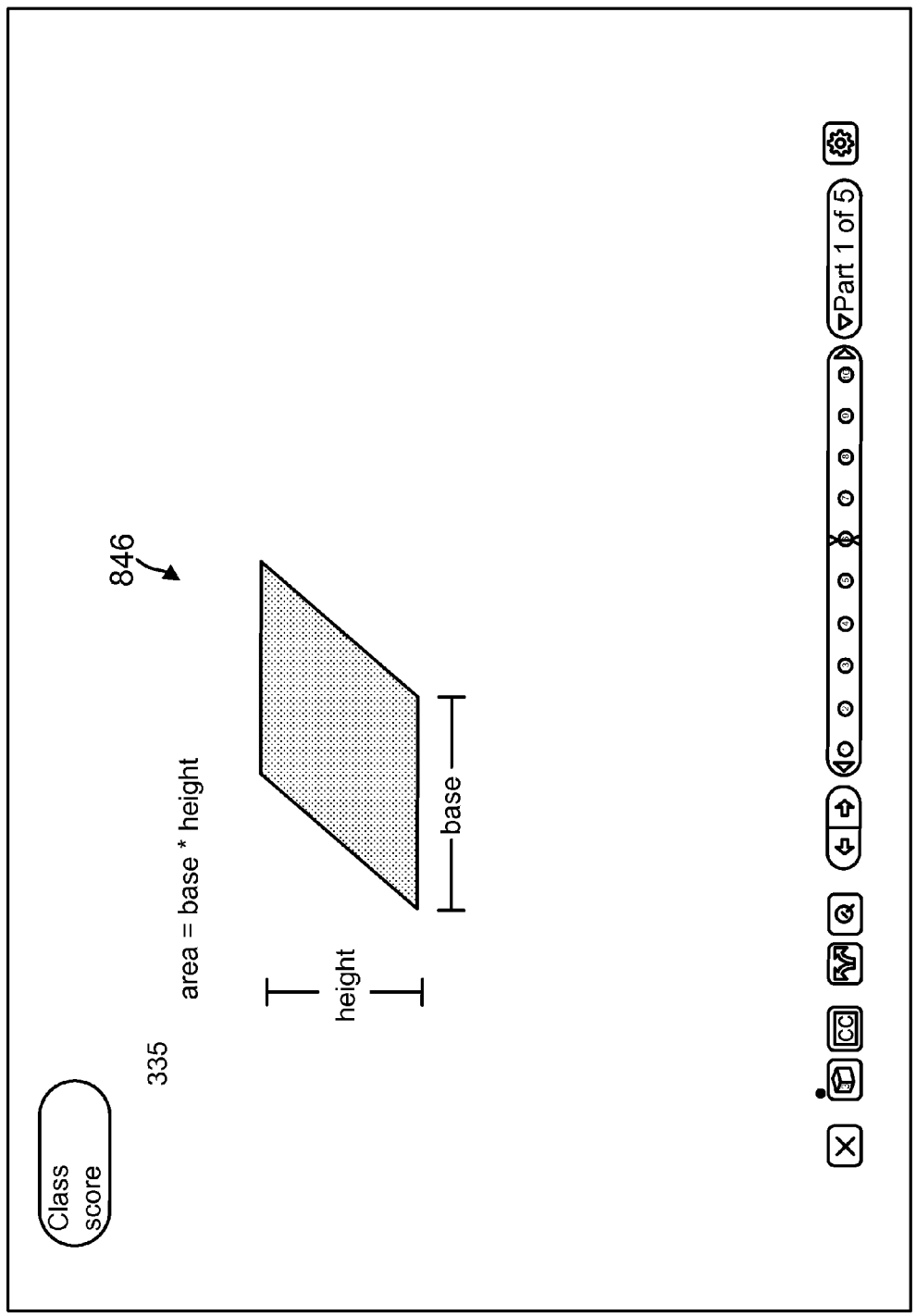

In FIG. 8D (8D-1 to 8D-4), the user continues to use the various domain databases mentioned above and also uses the character recognition 214 and symbolic manipulation 210 domains. In display 840 (FIG. 8D-1), the user illustrates that the water from display 838 fills the parallelogram proving that the area of the rectangle and the parallelogram are the same. In display 842 (FIG. 8D-2), the presentation system 102 interprets the user's draw paths to animate a vertical dividing line through the rectangle, and to drag the resulting triangle to the opposite side of the rectangle and rejoin it, thereby demonstrating how a parallelogram may be formed by changing the enclosed angles, but retaining the original area of the rectangle. In display 844 (FIG. 8D-3) and 846 (FIG. 8D-4), the user applies labels to the shapes, and formulas for calculating the areas of a rectangle and a parallelogram.

FIGS. 9A-9D (9A-1 to 9A-2/9B-1 to 9B-2) show a lesson plan for a tetrahedron. The various icons 902-917 (FIG. 9A-1) are similar to 802-817 described above with respect to FIG. 8A.

Figures 2, 9A:
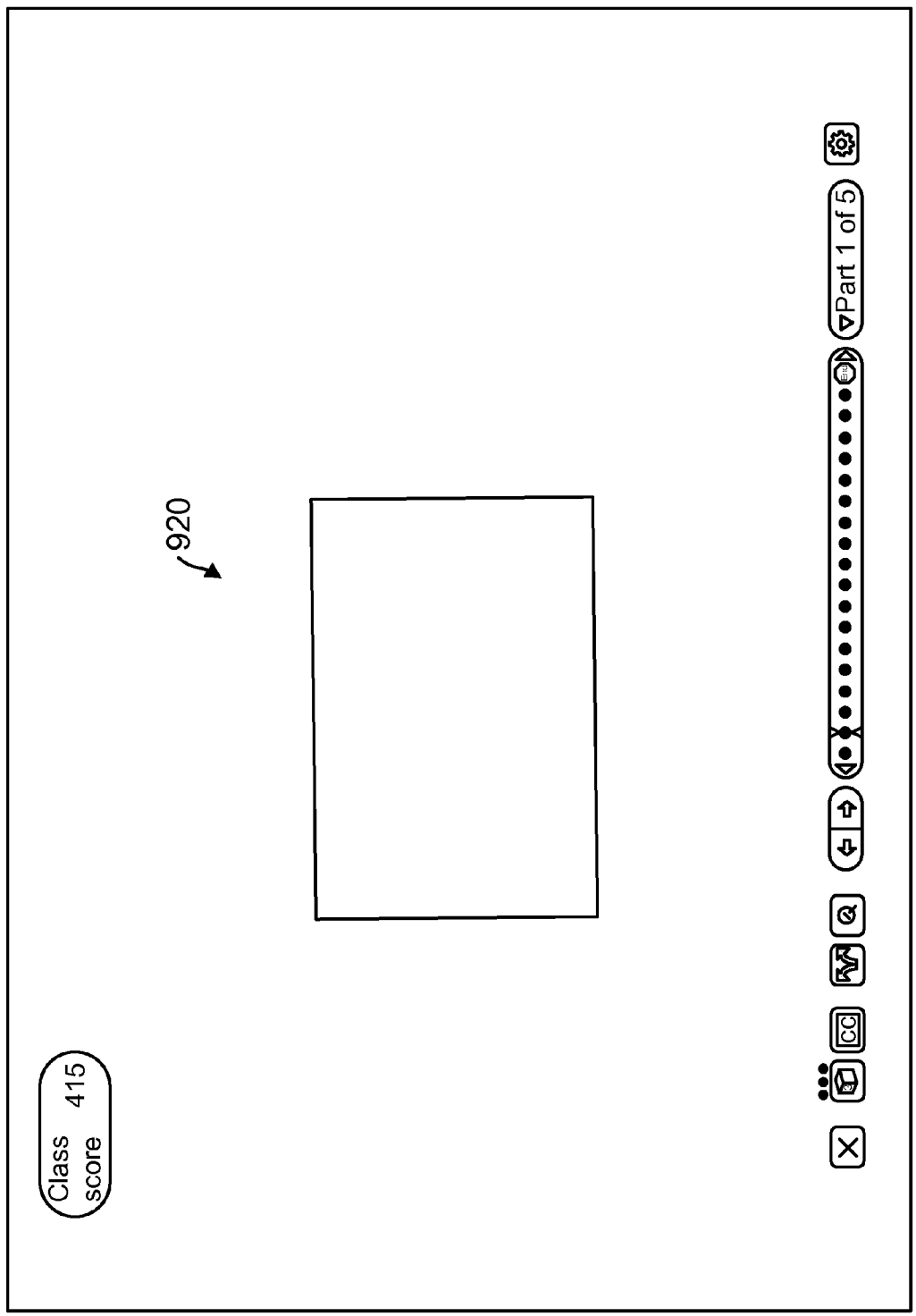

In display 900 (FIG. 9A-1), the user uses the interactive display device 104 to draw a rectangle. The freehand drawing is interpreted as a rectangle and displayed in display 920 (FIG. 9A-2). The lesson plan in this illustration uses the Open Drawing domain database 204 and the 2D domain database from the Shape domain database 206. The gesture set associated with displays 900 and 920 is the multi touch gesture set.

Figures 1, 9B:
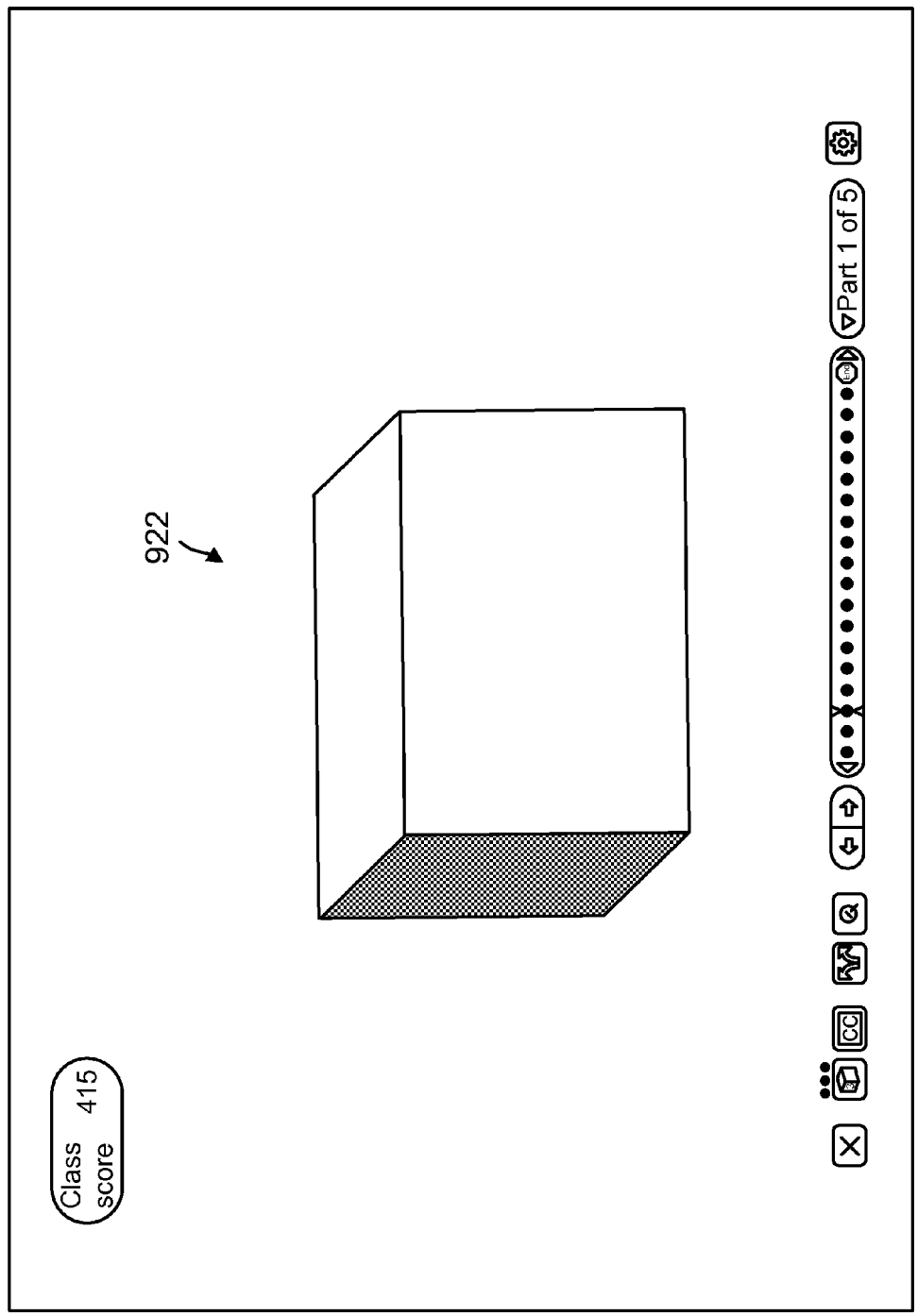
Figures 2, 9B:
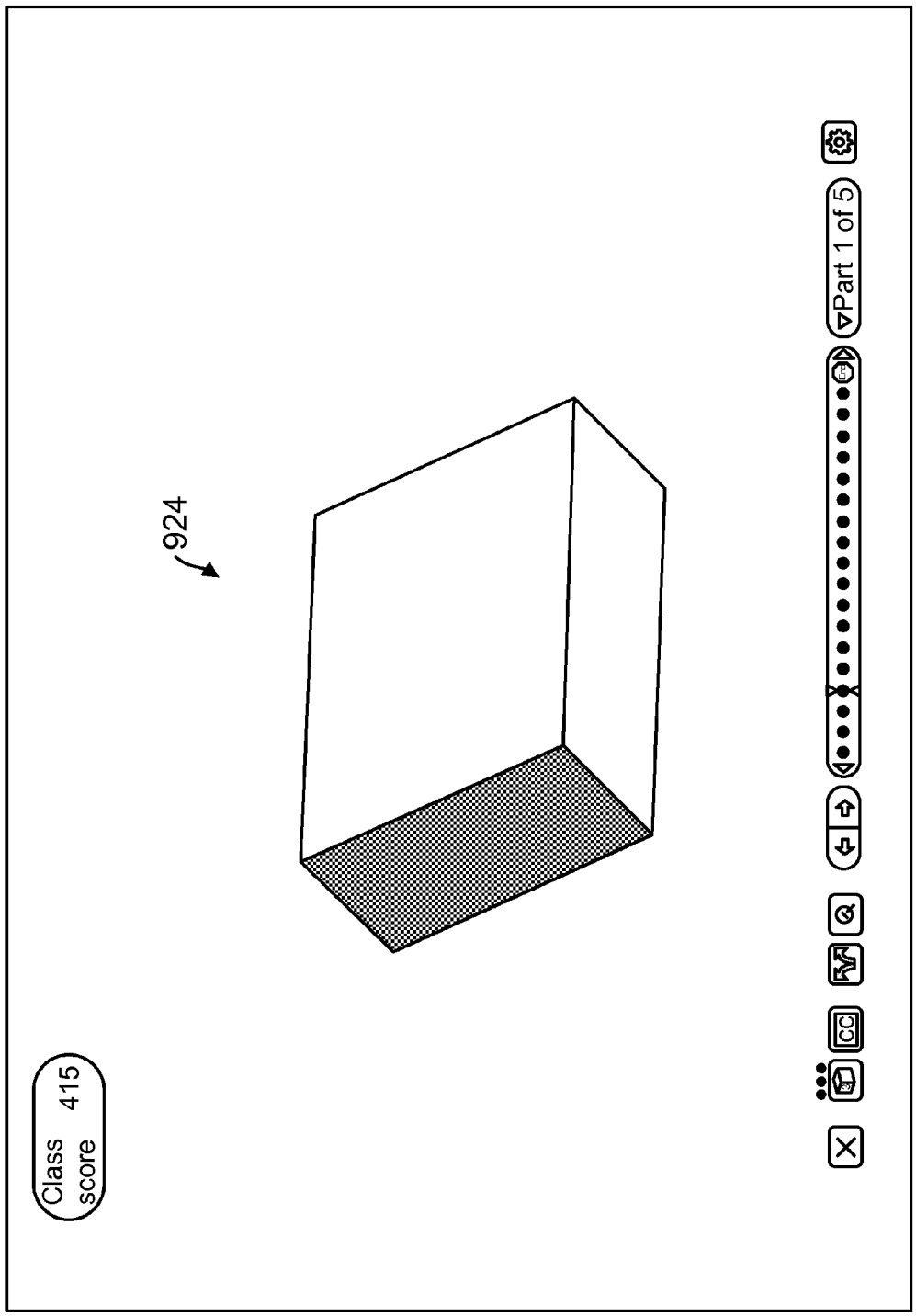

FIG. 9B continues to show the presentation where the 2D rectangle is extruded into the 3D structure at display 922 (FIG. 9B-1). The user swipes one corner of the rectangle from display 920 to generate the shape in display 922. Thus, in this example, the user gesture is associated with the 2D extrusion domain database, which may be a part of the shape database 206 described above in detail. The user may select any size shape within a predefined range, but the shape needs to be a rectangle, or box, as established by the presentation keyframe variables.

The user then uses a flicking motion on the interactive display device 104 to set the 3D object of display 922 in motion as shown in display 924 (FIG. 9B-2). In this example, the 3D Spatial Control gesture set is mapped by the 3D shape 206 and Spatial Object Manipulation domain databases 208.

Displays 926 (FIG. 9C-1) and 928 (FIG. 9C-2) show that the user continues with the lesson plan by drawing a series of lines onto the box shaped, 3D object to cut a section of the 3D object. The presentation system 102 interprets the user draw path and generates animated lines on three faces of the 3D object within a range of acceptable positions on the box. The user's gesture set may be a multi-touch or single touch and the draw paths are correlated with the Open Drawing 204 and 2D Shape domain 206 databases.

Figures 1, 9D:
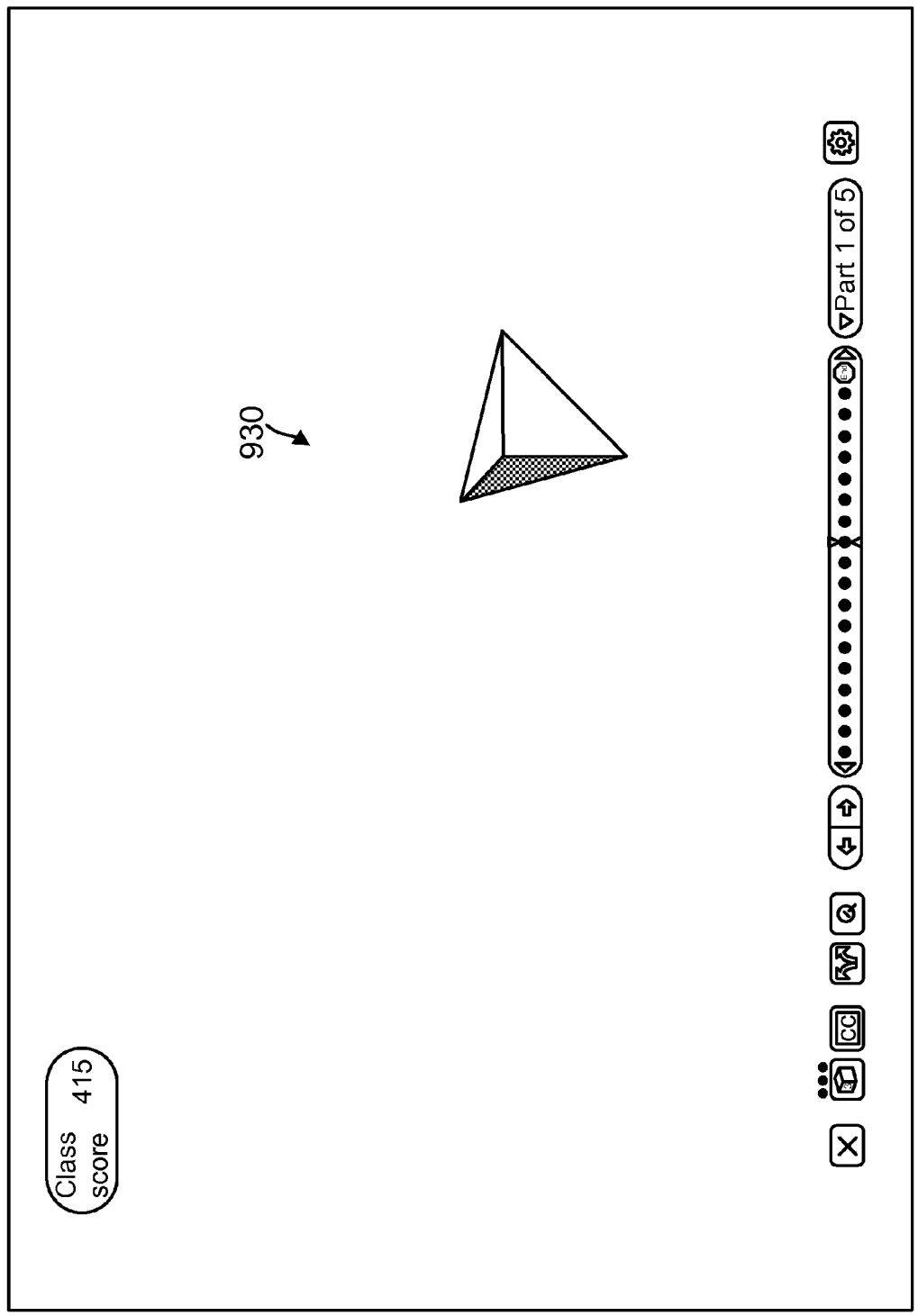
Figures 2, 9D:
Figures 3, 9D:
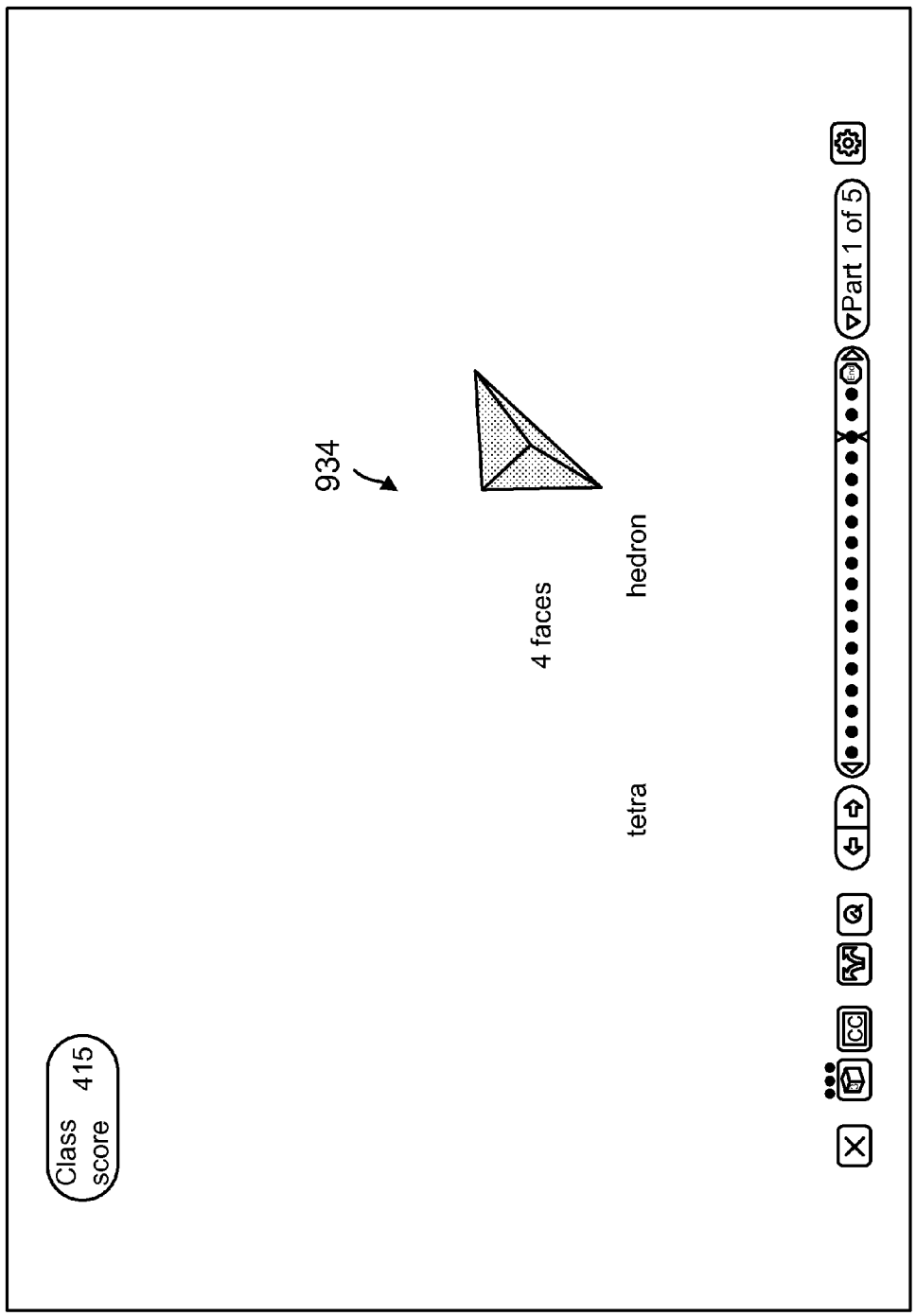

In display 930 of FIG. 9D-1, the user has selected and removed the triangular corner from display 928, presented the modified box, and then removed the box from view. The user's draw path is then interpreted to spin the resulting tetrahedron, and view all its sides. The user uses single touch, multi touch and 3D spatial control gesture sets to spin the tetrahedron; the user may apply color to the surface and label the shape as shown in displays 932 (FIG. 9D-2) and 934 (FIG. 9D-3, respectively. Displays 930, 932 and 934 use the 3D Shape 206, Character Recognition 214, 2D Shape 206 and the Fridge Magnet Mode 216 domain databases to transition the animations according to the user draw paths.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. Details regarding these layers are not germane to the inventive embodiments.

Thus, a method and apparatus for developing and presenting education materials have been described. Note that references throughout this specification to "one embodiment" or "an embodiment" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for developing a lesson plan, comprising:

using a graphical interface for developing a lesson plan having a plurality of keyframes for teaching a mathematical concept, wherein a keyframe is a defined step within an animation sequence and comprises indications of allowed content, display and user control;

adding at least one content object to at least a first keyframe wherein the content object for each keyframe is associated with a database domain from among a plurality of database domains that include an open drawing domain database capable of translating a draw path into a freehand drawing; a shape domain database capable of translating a draw path into a two- or three-dimensional shape; a spatial object manipulation domain database allowing two- or three-dimensional shapes to be modified; a symbolic manipulation domain database that enables draw path recognition to calculate formulas and equations; a measurement domain database that displays relative dimensions based on an original draw path; a character recognition domain database for representing alphanumeric characters; a fridge magnet mode domain database for enabling an object within a display to be grabbed; an object duplication domain database for creating multiple objects and a data display domain database for providing computational cells;

selecting a gesture for future use from a gesture set for controlling the at least one content object when displayed at an interactive display device for the first keyframe;

associating a mutable variable for the first keyframe at least one content object with the gesture, such that a user inputting the gesture will alter the mutable variable during presentation of the lesson plan; wherein the mutable variable has a default value and a range of variable values;

defining a default condition for the mutable variable;

assigning a fixed variable for at least one of the plurality of key frames;

adding one or more of text, label, dimension or expression to the first keyframe content; and establishing a transition gesture, such that a user inputting the transition gesture will trigger a transition between the first keyframe and a next keyframe, using animation specific to either of the first keyframe or the next keyframe, wherein the lesson plan can be operated in an advanced mode and an auto-play mode, wherein during presentation in the advanced mode a draw path is translated into the at least one content object and during presentation in the auto-play mode the at least one content object is animated without need for a draw path or user interaction; and wherein the gesture set includes single touch, multi-touch and three dimensional spatial control gestures for controlling an object from the first keyframe.

2. The method of claim 1, wherein the lesson plan is displayed at an interactive display device.

3. The method of claim 2, wherein the lesson plan is presented to a student on a computing system that is coupled to the interactive display device via a network.

4. The method of claim 1, wherein the lesson plan is presented using a presentation system that includes an input analyzer for analyzing a user input and associating the user input with a gesture set and a domain database.

5. The method of claim 1, wherein an animation engine provides animation between the first keyframe to the next keyframe.

6. A machine implemented method for presenting a mathematical lesson plan having a plurality of keyframes, comprising:

initializing a first keyframe, wherein a keyframe comprises a defined step within an animation sequence and includes indications of allowed content, display and user control;

accepting input from a user to determine whether to use an advanced mode or an auto-play mode;

when the advanced mode is determined:

detecting an input draw path from a user at an interactive display device;

correlating the input draw path with a gesture from a gesture set and one or more of database domains from among a plurality of database domains, wherein the gesture set includes single touch, multi-touch and three dimensional spatial control gestures for controlling an object from the first keyframe and the gesture is selected when a lesson plan is generated for future use for presenting the mathematical lesson; and wherein the plurality of database domains include an open drawing domain database capable of translating a draw path into a freehand drawing; a shape domain database capable of translating a draw path into a two- or three-dimensional shape; a spatial object manipulation domain database allowing two- or three-dimensional shapes to be modified; a symbolic manipulation domain database that enables draw path recognition to calculate formulas and equations; a measurement domain database that displays relative dimensions based on an original draw path; a character recognition domain database for representing alphanumeric characters; a fridge magnet mode domain database for enabling an object within a display to be grabbed; an object duplication domain database for creating multiple objects and a data display domain database for providing computational cells;

translating the input draw path into an object from one of the correlated database domains, wherein the object is included in the allowed content for the first keyframe;

displaying an image of the object at the interactive display device when all mutable variables for the first keyframe object are determined based on the input draw path; wherein each of the mutable variables have a default value and a range of variable values;

and manipulating the image using a gesture associated with the displayed image and any associated database domains;

when the auto-play mode is determined:

displaying an image of the object at the interactive display device using default values for all of the mutable variables for the first keyframe object; and transitioning to a next keyframe using animation specific to either of the first keyframe or the next keyframe.

7. The method of claim 6, wherein the lesson plan is displayed to a student on a computing system that is coupled to the interactive display device via a network.

8. The method of claim 6, wherein the lesson plan is presented using a presentation system that includes an input analyzer for analyzing the input and associating the input with a gesture set and a domain database.

9. The method of claim 6, wherein an animation engine provides animation from the first keyframe to the next keyframe.

10. A system for delivering educational content, comprising:

an interactive display device operationally coupled to a presentation system comprising a computing system for presenting educational content; wherein the presentation system is configured to:

initialize a first keyframe, wherein a keyframe comprises a defined step within an animation sequence and includes indications of allowed content, display and user control;

accept input from a user to determine whether to use an advanced mode or an auto-play mode;

when the advanced mode is determined:

detect an input draw path from a user at the interactive display device;

correlate the input draw path with a gesture from a gesture set and one or more of database domains from among a plurality of database domains, wherein the gesture set includes single touch, multi-touch and three dimensional spatial control gestures for controlling an object from the first keyframe and the gesture is selected when a lesson plan is generated for future use for presenting the educational content and wherein the plurality of database domains include an open drawing domain database capable of translating a draw path into a freehand drawing; a shape domain database capable of translating a draw path into a two- or three-dimensional shape; a spatial object manipulation domain database allowing two- or three-dimensional shapes to be modified; a symbolic manipulation domain database that enables draw path recognition to calculate formulas and equations; a measurement domain database that displays relative dimensions based on an original draw path; a character recognition domain database for representing alphanumeric characters; a fridge magnet mode domain database for enabling an object within a display to be grabbed; an object duplication domain database for creating multiple objects and a data display domain database for providing computational cells;

translate the input draw path into an object from one of the correlated database domains, wherein the object is included in the allowed content for the first keyframe;

display an image of the object at the interactive display device when all mutable variables for the first keyframe object are determined based on the input draw path; wherein each of the mutable variables have a default value and a range of variable values; and manipulate the image using a gesture associated with the displayed image and any associated database domains;

when the auto-play mode is determined:

display an image of the object at the interactive display device using default values for all of the mutable variables for the first keyframe object; and transition to a next keyframe using animation specific to either of the first keyframe or the next keyframe.

11. The system of claim 10, wherein the lesson plan is displayed to a student using a computing system that is coupled to the interactive display device via a network.

12. The system of claim 10, wherein the presentation system includes an input analyzer for analyzing the input and associating the input with a gesture set and a domain database.

13. The system of claim 10, wherein an animation engine provides animation from the first keyframe to the next keyframe.

14. The system of claim 10, wherein the interactive display device, the presentation system and the user computing system communicate via a network.

* * * * *